United States Patent
Oke et al.

(10) Patent No.: US 12,380,356 B2
(45) Date of Patent: Aug. 5, 2025

(54) IDENTIFYING NOISE IN VERBAL FEEDBACK USING ARTIFICIAL TEXT FROM NON-TEXTUAL PARAMETERS AND TRANSFER LEARNING

(71) Applicant: Microsoft Technology Licensing, LLC, Redmond, WA (US)

(72) Inventors: Isha Aniruddha Oke, Redmond, WA (US); Logan M. Ringer, Mukilteo, WA (US); Vandana Gunupudi, Redmond, WA (US); Yong Hui Ma, Bellevue, WA (US); Prabagaran Santhanakrishnan, Sammammish, WA (US); Mengtao Sun, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1030 days.

(21) Appl. No.: 16/995,350

(22) Filed: Aug. 17, 2020

(65) Prior Publication Data
US 2022/0051132 A1     Feb. 17, 2022

(51) Int. Cl.
*G06N 20/00*     (2019.01)
*G06F 16/36*     (2019.01)
(Continued)

(52) U.S. Cl.
CPC ............. *G06N 20/00* (2019.01); *G06F 16/36* (2019.01); *G06F 18/24* (2023.01); *G06F 40/237* (2020.01)

(58) Field of Classification Search
None
See application file for complete search history.

(56) References Cited

U.S. PATENT DOCUMENTS

| 2014/0164297 A1 | 6/2014 | Deolalikar et al. |
| 2021/0065051 A1* | 3/2021 | Khan ............... G06N 3/02 |

FOREIGN PATENT DOCUMENTS

| EP | 2960849 A1 | 12/2015 |
| EP | 3326116 A2 | 5/2018 |

OTHER PUBLICATIONS

Bisani M, Ney H. Joint-sequence models for grapheme-to-phoneme conversion. Speech communication. May 1, 2008;50(5):434-51. (Year: 2008).*

(Continued)

*Primary Examiner* — Incent Gonzales

(57) ABSTRACT

Methods and systems are provided for classifying free-text content using machine learning. Free-text content (e.g., customer feedback) and parameter values organized according to a schema are received. A free-text corpus is generated, and an artificial-text corpus is generated by applying rules to the parameter values. The artificial-text corpus is generated by converting the parameter values into a finite set of words based on the rules and concatenating the words of the finite set of words into a fixed sequence wordlist. Feature vectors (e.g., sentence embeddings) based on the free-text corpus and the artificial-text corpus are combined and forwarded to a machine learning model for classification. The machine learning model may be trained with a bias towards a specified metric (e.g., precision, recall, F1 score). The model may be trained using transfer learning with training data from a different category of free-text content (e.g., a different category of customer feedback).

20 Claims, 8 Drawing Sheets

(51) Int. Cl.
*G06F 18/24* (2023.01)
*G06F 40/237* (2020.01)

(56) References Cited

OTHER PUBLICATIONS

Liu R, Shi Y, Ji C, Jia M. A survey of sentiment analysis based on transfer learning. IEEE access. Jun. 26, 2019;7:85401-12. (Year: 2019).*
Alshari EM, Azman A, Doraisamy S, Mustapha N, Alkeshr M. Improvement of sentiment analysis based on clustering of Word2Vec features. In 2017 28th international workshop on database and expert systems applications (DEXA) Aug. 28, 2017 (pp. 123-126). IEEE. (Year: 2017).*
Kar R, Haldar R. Applying chatbots to the internet of things: Opportunities and architectural elements. arXiv preprint arXiv: 1611.03799. Nov. 11, 2016. (Year: 2016).*
Valera, Manisha, and Yash Patel. "A peculiar sentiment analysis advancement in big data." In Journal of Physics: Conference Series, vol. 933, No. 1, p. 012015. IOP Publishing, 2017. (Year: 2017).*
Montgomery, Lloyd, Daniela Damian, Tyson Bulmer, and Shaikh Quader. "Customer support ticket escalation prediction using feature engineering." Requirements Engineering 23 (2018): 333-355. (Year: 2018).*
"Deep Learning for Specific Information Extraction from Unstructured Texts", Retrieved from: https://towardsdatascience.com/deep-learning-for-specific-information-extraction-from-unstructured-texts-12c5b9dceada, Jul. 21, 2018, 8 Pages.
"Keyword Extraction", Retrieved from: https://web.archive.org/web/20200416081333/https:/monkeylearn.com/keyword-extraction/, Apr. 16, 2020, 66 Pages.
"Overview: Extracting and Serving Feature Embeddings for Machine Learning", Retrieved from: https://cloud.google.com/solutions/machine-learning/overview-extracting-and-serving-feature-embeddings-for-machine-learning, Retrieved Date: Jun. 6, 2019, 17 Pages.
Lin, Tom, "[NLP] Performance of Different Word Embeddings on Text Classification", Retrieved from: https://towardsdatascience.com/nlp-performance-of-different-word-embeddings-on-text-classification-de648c6262b, Jul. 10, 2019, 12 Pages.
Loeshelle, Ellen, "Debunking NLP: Detecting Actionable Sentences", Retrieved from: https://www.clarabridge.com/blog/debunking-nlp-detecting-actionable-sentences, Nov. 17, 2017, 4 Pages.
Nayebi, et al., "ESSMArT Way to Manage User Requests", In Repository of arXiv preprint arXiv:1808.03796, Aug. 11, 2018, pp. 1-27.
Nelson, Paul, "Natural Language Processing (NLP) Techniques for Extracting Information", Retrieved from: https://web.archive.org/web/20191207040834/https:/www.searchtechnologies.com/blog/natural-language-processing-techniques, Dec. 7, 2019, 17 Pages.
Petrovski, et al., "Extracting Attribute-Value Pairs from Product Specifications on the Web", In Proceedings of the International Conference on Web Intelligence, Aug. 23, 2017, 8 Pages.
Brownlee, Jason, "A Gentle Introduction to Transfer Learning for Deep Learning", Retrieved from: https://machinelearningmastery.com/transfer-learning-for-deep-learning/, Dec. 20, 2017, 44 Pages.
Faulbrück, et al., "Generating Synthetic Comments to Balance Data for Text Classification", Retrieved from: https://humboldt-wi.github.io/blog/research/information_systems_1920/text_generation/, Feb. 7, 2020, 56 Pages.
"International Search Report and Written Opinion Issued in PCT Application No. PCT/US21/030988", Mailed Date: Aug. 27, 2021, 11 Pages.
Wu, et al., "Word Mover's Embedding: From Word2Vec to Document Embedding", In Repository of arXiv:1811.01713v1, Oct. 30, 2018, 15 Pages.

\* cited by examiner

IDENTIFYING NOISE IN VERBAL FEEDBACK USING ARTIFICIAL TEXT FROM NON-TEXTUAL PARAMETERS AND TRANSFER LEARNING

BACKGROUND

Companies that sell or manage computer implemented products and/or services often provide their customers with customer feedback systems for reporting issues or providing comments regarding their products. Users, whether software developers, technology managers, end users, etc. may submit verbal feedback (e.g., spoken or written natural language) to the system, and their verbal feedback may be stored as free-text. In one example, user initiated feedback (UIF) received via a feedback hub includes up-to-date streams of users' comments, complaints, suggestions, and "gibberish" that are posted regarding a product, service, or feature. In addition to the verbal user feedback, each UIF record may also carry supplemental information about a host device, an application, an operating system, etc. that may be associated with the feedback. The supplemental information may be referred to as background parameters.

Often, technical support teams (e.g., support teams for Microsoft® Core Operating System and Intelligent Edge (COSINE) Enterprise & Security (EnS)) have a specialist who triages customer feedback manually and filters noise (e.g., irrelevant text) before the feedback is analyzed further to resolve the customer's issues. The noise may be dismissed as "non-actionable." Feedback text that is deemed to include useful information may be identified as actionable for further analysis and/or generating a response action. For product or service categories with a high volume of textual feedback (e.g., Microsoft® Windows Licensing and Activation or Microsoft® Windows Hello), the triage specialist may spend several hours per week manually pre-screening user feedback for actionable vs non-actionable text.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided for a machine learning method for classifying free-text content. The method comprises receiving the free-text content and receiving one or more parameter values. The one or more parameter values are organized in accordance with a schema and associated with the free-text content. A free-text corpus may be generated based on the free-text content. An artificial-text corpus may be generated by applying each of one or more rules to a respective one of the one of the one or more parameter values. A feature vector may be generated based on the free-text corpus. A feature vector may be generated based on the artificial-text corpus. The feature vector based on the free-text corpus and the feature vector based on the artificial-text corpus may be combined to generate a combined feature vector. A trained machine learning model may generate a classification relating to the free-text content based on the combined feature vector.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
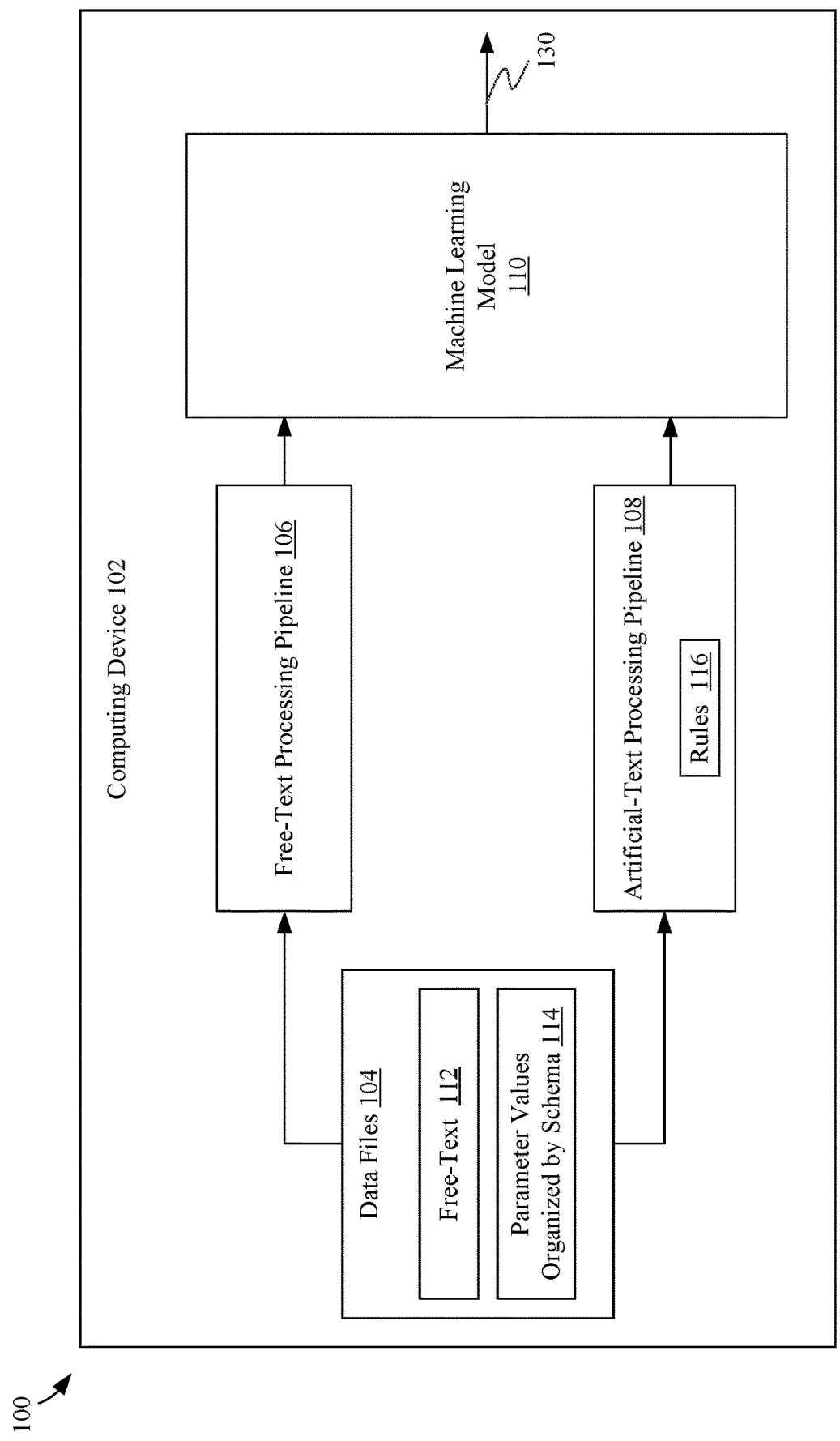
FIG. 1 is a block diagram of a system configured to classify free-text using a machine learning model with input comprising features based on free-text and artificial-text, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes and are not limiting. The examples described herein may be adapted to any type of method or system for securing access to computing resources of an accessory device. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Product support systems may be designed to capture customer feedback regarding a product or a service. The systems may receive verbal feedback from users (e.g., in the form of naturally spoken or written content) and may store the verbal feedback as free-text. As described above, triage specialists may manually review the customer feedback and identify which portions of the free-text are useful for applying a further level of analysis and generating a response action. Free-text that is deemed unimportant may be marked as dismissed (e.g., indicating no further action needed). Companies that triage and/or process such customer feedback may retain historical data that has already been classified and tagged as, for example, actionable vs non-actionable, or dismissed vs. triaged. The present disclosure provides methods and systems that may be configured to use machine learning to identify the "noise" or non-actionable data in free-text based on patterns of past triage results. In other words, in some embodiments, the system may be configured to classify free-text as actionable or non-actionable.

In general, free-text (e.g., user feedback) may be paired with one or more parameter values. The parameter values may be considered supplemental information relative to the free-text and may include, for example, background parameters, various attributes, context information, etc. The parameter values may be stored in a table and/or stored according to a schema. Each of the parameter values may be associated with a parameter name. For example, a column of parameter values in a table may have a column heading comprising the parameter name. In a schema, each parameter value may be associated with a schema name (i.e., a parameter name) according to a convention of the schema. The parameter name may be referred to as a parameter, a schema name, a column name, or a column heading, for example.

As described above, the disclosed methods and systems use machine learning to classify free-text. The free-text may comprise, for example, verbal user feedback and may be paired with one or more parameters values. Input to the machine learning model may have two components: 1) the free-text and 2) artificial-text that is generated based on the one or more parameter values according to one or more respective rules. The machine learning model may output a classification of the free-text (e.g., a binary classification comprising actionable vs non-actionable). The machine learning model may be trained using supervised learning. In some embodiments, transfer learning may be utilized where data gathered from another category or subject matter is utilized to train the machine learning model for classifying the free-text.

The presently described methods and systems for classifying free-text in a machine learning model based on the free-text and converted parameter values, yields valuable performance benefits. These methods provide a highly efficient way of converting high-dimensional parameter data into low-dimensional data while preserving context of interrelated columns of the parameter data, which is very important to artificial intelligence (AI) pursuits. Moreover, this approach is extensible to almost any use case that requires vectorization of attributes for a machine learning model. The conversion of parameter values into artificial-text provides for a reduction in the dimensionality of a corresponding feature set that is processed by the machine learning model. The reduction in dimensionality corresponds to a reduction in processing time for performing the classification (and for training the machine learning model) and a reduction in the amount of processor cycles and memory required to perform the classification. Also, using both of the artificial-text and the free-text for generating an input to the machine learning model improves the quality of the classification results as compared to using the free-text alone. Moreover, automating the triage process speeds the triage process tremendously, thereby freeing computer resources that would otherwise be required to carry out the triage process manually.

FIG. 1 is a block diagram of a system 100 configured to classify free-text using a machine learning model with input comprising features based on free-text and artificial-text, according to an example embodiment. As shown in FIG. 1, system 100 includes a computing device 102. Computing device 102 includes data files 104, free-text processing pipeline 106, artificial-text processing pipeline 108, and machine learning model 110. Data files 104 include free-text 112 and parameter values 114. Artificial-text processing pipeline 108 includes artificial-text generation rules 116 (i.e., rules 116). Also shown is a classification output 130.

Computing device 102 may comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a gaming console/system (e.g., Microsoft Xbox®, Sony PlayStation®, Nintendo Wii® or Switch®, etc.), an appliance, a set top box, etc.

Although computing device 102 will be described herein as including certain components and performing certain operations, persons skilled in the relevant art(s) will appreciate that, in alternate embodiments, such components and operations may be distributed across multiple computing devices that operate together to classify free-text in accordance with the techniques described herein.

Data files 104 may include data received from one or more data streams and/or data belonging to one or more categories of data. In some embodiments, data files 104 may be formatted as comma separated values (CSV). However, the disclosure is not limited in this regard, and data files 104 may be formatted in any suitable manner. Data files 104 may include records comprising free-text 112 and parameter values 114. In some embodiments, free-text 112 may comprise verbal communication having a grammatical basis, such as written or spoken natural language and may include human formatted sentences and/or paragraphs. Each instance of free-text 112 may be associated with (i.e., paired with) one or more parameter values 114 (e.g., a record may include free-text and one or more parameter values). Parameter values 114 may be stored in a table and/or according to a schema. Each parameter value 114 may be associated with a parameter (i.e., a parameter name, schema name, column heading, etc.). Parameter values 114 may provide supplemental information relative to an instance of free-text 112 (e.g., context information) and may be referred to as background parameters. For example, if a particular instance of free-text 112 comprises customer feedback pertaining to a problem that occurred while running a particular software application, a corresponding set of parameter values 114 may include an identifier of the software application, a build version of the software application, an identifier of a device running the software application when the problem occurred, an operating system release identifier of an operating system interacting with the application, a remote access status of a user (e.g., true or false), etc. The following list includes examples of free-text 112 and parameter values 114 that can be used in generating artificial-text. Here, the parameters (i.e., parameter names, schema names, column headers, etc.) are "Build," "OsRelease," and IsDomain-Joined."

Free-text: "Windows Hello is not working for me"
    Build: 17xxx
    OsRelease: rs_xx
    IsDomainJoined: False In another example embodiment, if free-text 112 comprises a verbal description of a physical artifact, parameter values 114 may include values for background parameters such as "Location," "Materials," and "Date" for a location where the artifact was found, materials the artifact is made of, and a date that the artifact was found. Content of free-text 112 may be suitable to be the subject of classification (e.g., binary classification) by a supervised learning algorithm in machine learning model 110.

In one embodiment, data files 104 may comprise data files from various streams of user feedback for one or more respective computer implemented products. For example, a business (e.g., Microsoft®) may provide a wide range of computer implemented products and/or services. Each product or service may include multiple features that may be utilized by users such as internal developers, administrators, or external customers. The users of each product, service, or feature may provide verbal feedback such as comments, complaints, suggestions, or unintelligible language that may be stored as free-text 112. The verbal feedback may be categorized by the product, service, or feature to which the verbal feedback applies. In addition, each user feedback record comprising free-text 112 may also include one or more parameter values 114 (i.e., background or supplementation information). For example, parameter values 114 may include information about the product or feature that the user feedback pertains to (e.g., an application identifier, a device running the product or feature, software that interacts with the product or feature (e.g., operating system version), etc. In some user feedback systems, the system may automatically retrieve such parameters values when user feedback comprising free-text 112 is submitted into the system. In other systems, a user or administrator may manually submit such parameter values, for example, via a form in a browser. Some of the user feedback represented by free-text 112 may not be useful while other feedback may be actionable and helpful to improve the products, services, or features. System 100 may be utilized to filter out user feedback that is considered to be non-actionable.

Free-text processing pipeline 106 is configured to receive and process free-text 112 to generate numerical feature vectors that may be used for training and/or for prediction in machine learning model 110. As described in more detail below with respect to FIG. 3, free-text processing pipeline 106 may be configured to perform text cleaning on free-text 112 and generate a free-text corpus. Free-text processing pipeline 106 may be further configured to vectorize the free-text corpus to generate the free-text numerical feature vectors. In some embodiments, the free-text numerical feature vectors may comprise word embeddings and/or sentence embeddings, and may be referred to as such. For example, free-text processing pipeline 106 may be configured to utilize word embedding and/or sentence embedding models (e.g., Word2Vec and/or Doc2Vec) to generate the free-text numerical feature vector. Thus, the free-text numerical feature vector may be referred to as a word embedding or a sentence embedding. However, the present disclosure is not limited to using sentence embeddings, and other suitable types of numerical features vectors may be utilized for representing the free-text corpus. The sentence embeddings generated based on free-text 112 may be processed by machine learning model 110 to generate a classification result 130 pertaining to free-text 112.

Artificial-text processing pipeline 108 is configured to receive parameter values 114 and process parameter values 114 utilizing artificial-text generation rules 116 to generate an artificial-text corpus. Artificial-text processing pipeline 108 may be further configured to convert the artificial-text corpus into artificial-text numerical feature vectors, which may comprise word embeddings and/or sentence embeddings, and may be used for training and/or for prediction in machine learning model 110. For example, artificial-text pipeline 108 may utilize word embedding and/or sentence embedding models (e.g., Word2Vec and/or Doc2Vec) to generate the artificial-text numerical feature vector. Thus, the artificial-text numerical feature vector may be referred to as a word embedding or a sentence embedding. However, the present disclosure is not limited to using sentence embeddings, and other suitable types of numerical features vectors may be generated and utilized to represent the artificial-text corpus.

Machine learning model 110 may comprise a supervised learning model (e.g., a logistic regression model, a LightGBM model, a Random Forest model, etc.). Machine learning model 110 is configured to receive and process both of the feature vectors (e.g., sentence embeddings) based on the free-text and the artificial-text and determine a classification result 130. Machine learning model 110 may be trained based on training data comprising historical free-text data, corresponding historical parameter values, and corresponding historical classification results. In one example, the historical free-text data may have been classified (e.g., as actionable vs non-actionable, dismissed vs triaged, etc.) as a result of manual analysis performed by a user.

Figure 2:
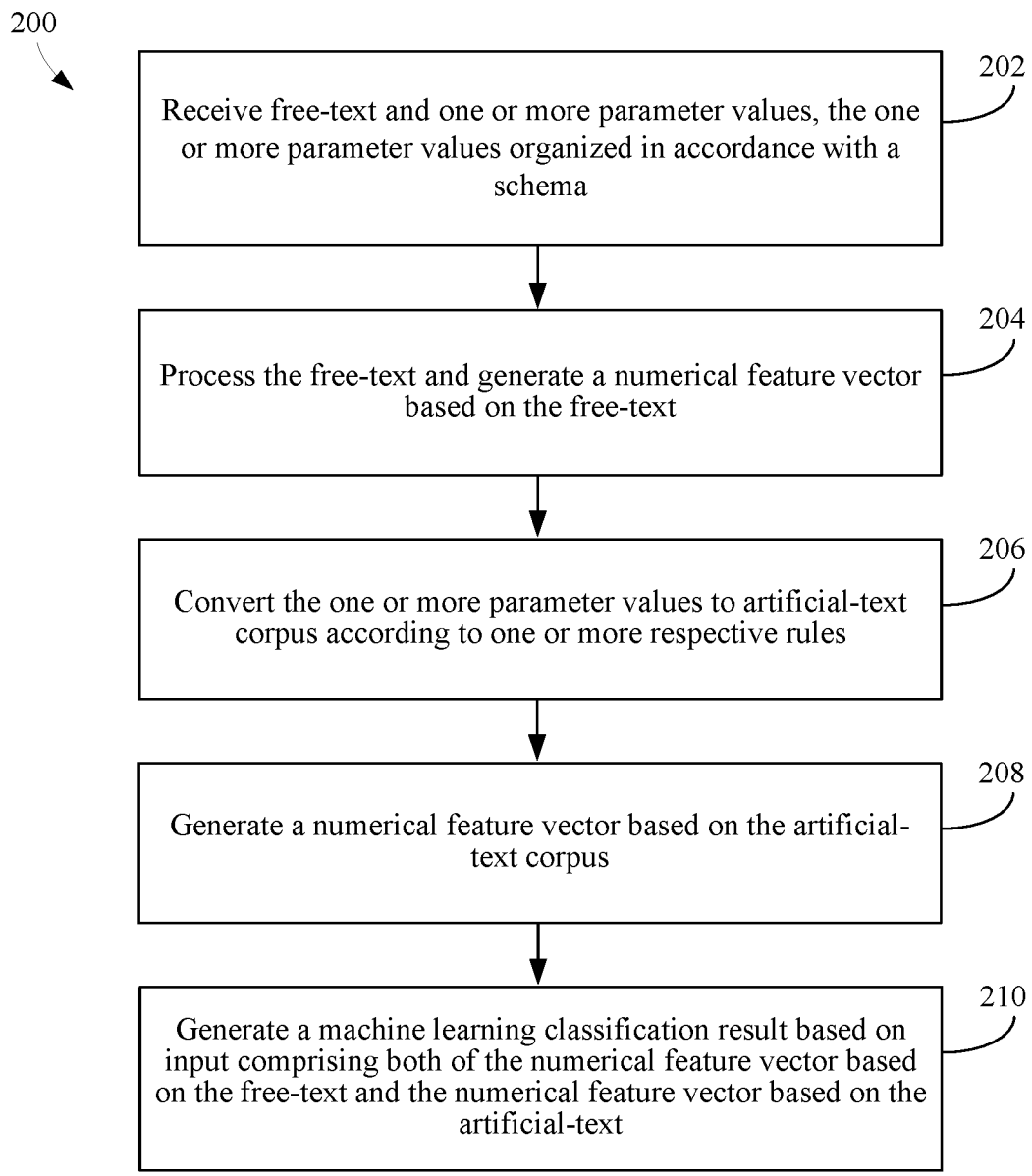
FIG. 2 is a flowchart of a method for classifying free-text using a machine learning model with input comprising features based on free-text and artificial-text, according to an example embodiment.

In embodiments, system 100 may operate in various ways to perform its functions. For example, FIG. 2 is a flowchart 200 of a method for classifying free-text using a machine learning model with input comprising features based on free-text and artificial-text, according to an example embodiment. Flowchart 200 may be performed by computing device 102. For the purpose of illustration, flowchart 200 of FIG. 2 is described with reference to FIG. 1.

Flowchart 200 of FIG. 2 begins with step 202. In step 202, free-text and one or more parameter values are received, wherein the one or more parameter values are organized in accordance with a schema. For example, free-text 112 and one or more parameter values 114 may be extracted from one or more data files 104. Free-text 112 may be received by free-text processing pipeline 106 and one or more parameter values 114 may be received by artificial-text processing pipeline 108. In some embodiments, data files 104 may receive data from one or more streams of data and may be formatted as comma separated variables. A record from data files 104 may comprise an instance of free-text 112 and corresponding one or more parameter values 114. Free-text 112 may comprise verbal communication having a grammatical basis, such as written or spoken natural language stored as free-text. Parameter values 114 may comprise data stored in a table format and/or organized according to a schema. Each of the one or more parameter values 114 may be associated with a parameter (i.e., a parameter name, a schema name, a column heading, a tag, a label, an index, etc.). Parameter values 114 may provide supplemental information relative to free-text 112 (e.g., context information).

In step 204, the free-text is processed and a numerical feature vector is generated based on the free-text. For example, free-text 112 is processed in free-text processing pipeline 106 and a numerical feature vector (e.g., a sentence embedding or word embedding) is generated based on free-text 112. Free-text processing pipeline 106 may perform text cleaning techniques on free-text 112 and vectorize the cleaned free-text 112 to generate the numerical feature vector. For example, free-text processing pipeline 106 may utilize word embedding and/or sentence embedding techniques (e.g., Word2Vec and/or Doc2Vec) to generate the numerical feature vector.

In step 206, the one or more parameter values may be converted to an artificial-text corpus according to one or more respective rules. For example, one or more parameter values 114 may be converted to artificial-text according to rules 116 by artificial-text processing pipeline 108.

In step 208, a numerical feature vector may be generated based on the artificial-text corpus. For example, artificial-text processing pipeline 108 may generate a numerical feature vector based on the artificial-text corpus. Artificial-text processing pipeline 108 may utilize word embedding and/or sentence embedding techniques (e.g., Word2Vec and/or Doc2Vec) to generate the artificial-text numerical feature vector.

In step 210, a machine learning classification result 130 may be generated based on input comprising both of the numerical feature vector based on the free-text corpus and the numerical feature vector based on the artificial-text. For example, machine learning model 110 may receive the numerical feature vector generated based on the free-text corpus from the free-text pipeline 106 and receive the numerical feature vector generated based on the artificial-text corpus from artificial-text processing pipeline 108. Machine learning model 110 may generate classification result 130 based on both of the received numerical feature vectors. Machine learning model 110 may comprise a supervised learning model (e.g., a logistic regression model, a LightGBM model, a Random Forest model, etc.). The feature vector based on the free-text corpus and the feature vector based on the artificial-text corpus may comprise sentence embeddings and/or word embeddings generated based on Doc2Vec and/or Word2Vec techniques. Machine learning model 110 may be trained based on historical free-text data, corresponding historical parameter values, and corresponding historical classification results. In one example, free-text 112 may comprise verbal user feedback (e.g., customer feedback regarding a product or service). Classification result 130 may indicate that the user feedback is non-actionable (e.g., deemed not useful for customer service) or is actionable (e.g., useful for solving a problem, providing technical support, updating a product, or adding a feature).

Figure 3:
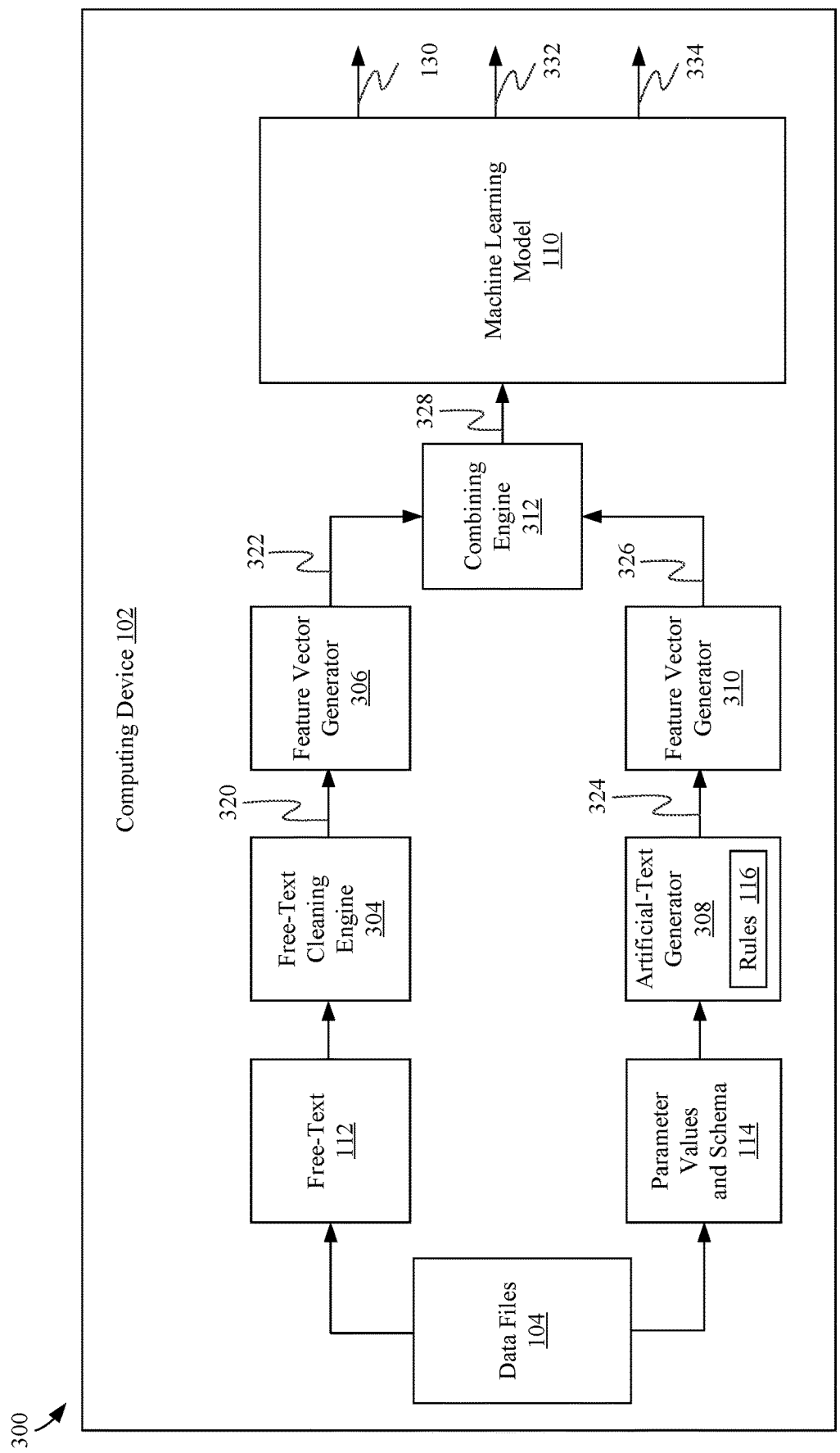
FIG. 3 is a block diagram of a system configured to convert structured data to artificial-text and classify free-text using machine learning based on the free-text and the artificial-text, according to an example embodiment.

Embodiments of systems that classify free-text using a trained machine learning model with input features based on free-text and artificial-text may be implemented in various ways. For instance, FIG. 3 is a block diagram of a system 300 configured to convert structured data to artificial-text and classify free-text using machine learning based on the free-text and the artificial-text, according to an example embodiment.

System 300 includes computing device 102, data files 104, free-text 112, parameter values 114, artificial-text generation rules 116 (i.e., rules 116), a machine learning model 110, and a classification result 130. Also included in system 300 are a free-text cleaning engine 304, a feature vector generator 306, an artificial-text generator 308, a feature vector generator 310, a combining engine 312, a free-text corpus 320, numerical feature vectors 322, an artificial-text corpus 324, numerical feature vectors 326, combined feature vectors 328, classification result 130, a classification result 332, and a classification result 334.

Free-text processing pipeline 106 may comprise free-text cleaning engine 304 and feature vector generator 306. Artificial-text processing pipeline 108 may comprise artificial-text generator 308 and feature vector generator 310.

Free-text cleaning engine 304 may be configured to receive free-text 112, which may be extracted from data files 104. Free-text cleaning engine 304 may be configured to perform text cleaning techniques on free-text 112 to generate free-text corpus 320. The text cleaning techniques may include, for example, removing HTML, tokenization, removing punctuation, removing stop words, lemmatization or stemming, etc. In general, text cleaning processes sometimes remove various types of characters such as "#" that are not part of a natural language alphabet or a numeral. However, in some embodiments, for example, where content of free-text 112 pertains to technical subject matter (e.g., rather than social media text), such types of characters may be significant in determining a classification result 130. Therefore, when performing tokenization or sentence boundary detection, free-text cleaning engine 304 may be configured to retain these types of characters in free-text corpus 320. Free-text cleaning engine 304 is configured to transmit free-text corpus 320 to feature vector generator 306.

Artificial-text generator 308 may be configured to receive one or more parameter values 114. The one or more parameter values 114 may be organized in accordance with a schema and may include schema information such as a schema name (i.e., parameter name, column heading, etc.). The one or more parameter values 114 may be extracted from data files 104. Artificial-text generator 308 may be configured to generate artificial-text corpus 324 based on the one or more parameter values 114 and rules 116. Rules 116 may specify how to generate artificial-text corpus 324 from the one or more parameter values 114 and the schema information. For example, artificial-text generator 308 is configured to convert the one or more parameter values 114 to a finite set of words based one or more respective rules 116, and concatenate the words of the finite set of words into a fixed sequence wordlist to generate artificial-text corpus 324. Some examples of rules 116 include 1) converting parameter values of a particular parameter name (i.e., schema name or column name) to a word comprising either blank or a non-blank, 2) using parameter values having a particular parameter name as words, 3) converting numerals having a particular parameter name to a word, 3) concatenating a parameter value with a corresponding parameter name to form a word. Rules 116 may be determined based on analysis of a plurality of sets (or records) of one or more parameter values 114. For example, the plurality of sets of parameter values 114 used for determining artificial-text generation rules 116 may comprise historical or training data. Alternatively, or in addition, artificial-text generation rules 116 may be determined based on multiple sets of parameter values 114 from records of data files 104 that have not yet been classified.

In some embodiments, the parameter values 114 may be organized according to a schema representing a table with columns having column headers, and rows of fields comprising parameter values 114 distributed over the columns. One example of determining artificial-text generation rules 116 for such a schema follows:

1. If N % of the parameter values of a particular schema name (or column) have a NULL value, then replace the parameter values with either "_blank" or "_nonblank" values. In one example, N may equal 95 such that if 95% of the parameter values of a schema name (or column) have a NULL value, then, the parameter values of that schema name (or column) are replaced with either "_blank" or "_nonblank" values for generating the artificial-text corpus 324.

2. If a count of distinct parameter values of a particular schema name (or column) is less than or equal to M, then use the parameter value(s) of that particular schema name (or column) as word(s). In one example, M may equal 20. Then, if the count of distinct parameter values of a schema name (or column) is less than or equal to 20, use the parameter values of the schema name (or column) as words for generating the artificial-text corpus 324.

3. If a count of distinct parameter values of a particular schema name (or column) is greater than M, and the parameter values are of type=string, then replace the parameter values with either "_blank" or "_nonblank" values. In one example, M may equal 20. Then if the count of distinct parameter values of a particular schema name (or column) is greater than 20, and the parameter value is of type=string, replace all of the parameter values of the schema name (or column) with either "_blank" or "_nonblank" values for generating the artificial-text corpus 324.

4. If a count of distinct parameter values 114 of a particular schema name (or column) is greater than M, and the parameter values are of type=numeric, then divide all of the parameter values of the schema name (or column) into X number of quantiles. Then take each quantile as a separate word, and assign the X words as _word0 to _wordX−1 respectively. In one example, M may equal 20 and X may equal 12. Then, if the count of distinct parameter values of a particular schema name (or column) is greater than 20, and the parameter values are of type=numeric, then divide all of the parameter values of the schema name (or column) into 12 quantiles. Then take each quantile as a separate word, and assign the 12 words as _word0 to _word11 respectively for generating the artificial-text corpus 324.

Once artificial-text generation rules 116 are determined, they may be applied to parameter values 114 to generate artificial-text corpus 324 for training and/or for prediction (e.g., binary classification) in machine learning model 110.

The following Code Example 1 comprises an example of a word generated from a parameter value by applying rule 4 above as a rule from artificial-text generation rules 116. The parameter value may be located in fields of a column in a table, or may be organized according to a schema. The generated word includes the name of the column comprising the parameter values (or the parameter name, schema name, etc.). The parameter values are of type numeric and the column name (or parameter name, schema name, etc.) is "SetupUpgradeFromBuildNumber." The first quantile of the combined parameters has a value of 16299 and is assigned word_0.

Code Example 1: Artificial Word Based on Numeric Type Parameter Values

Word: _SetupUpgradeFromBuildNumber_16299_0_:
From column: SetupUpgradeFromBuildNumber, column value is 16299_0

The following Code Example 2 comprises an example of a word generated from a parameter value by applying rule 2 (above) of artificial-text generation rules 116. The generated word includes the column name (i.e., parameter name, schema name, etc.) corresponding to the source field of the parameter value. The parameter value is of type string and the column name is "IsCloudDomainJoined." The parameter value is "False."

Code Example 2: Artificial Word Based on String Type Parameter Values

Word: _IsCloudDomainJoined_False_
From column: IsCloudDomainJoined, value is "False"

One exception to applying artificial-text generation rules 116 (e.g., the above rules 1-4) may be to exclude parameter values 114 from records that have been modified relative to their original state. For example, where one or more fields of parameter values 114 or corresponding free-text 112 have been modified by an administrator as a result of a triage process, those records may be considered contaminated and should not be used for generating artificial-text for training machine learning model 110.

The following Code Example 3 comprises an example of code snippets for applying artificial-text-generation rules 116:

Code Example 3: Code Snippets for Applying Artificial-Text Generation Rules

If x['per_nan']>0.95;
    rule['name']='per_nan_gt95'
    rule['description']='if per_nan>0.95: then just _col_ blank_ or _col_nonblank_'
. . .

Elif (x['uniques']<self.uniques) & (x['length']< self.maxt_text_length):
    rule['name']='cat_short'
    rule['description']='self.uniques less than 6: if len(str(col)) less than 50 then_col_str(col)_ or _col_nonblank_'
. . .

Although specific artificial-text generation rules 116 rules including rules 1-4 (above) and Code Example 3 have been described herein, the present disclosure is not limited to any specific artificial-text generation rules and any suitable rules for generating an artificial-text corpus may be utilized.

The following Table 1 includes an example of parameter values 114, corresponding schema names, and artificial words generated based on rules 116.

TABLE 1

Artificial Words Generated based on Rules

| Schema Name | Parameter Value | Artificial Words (Based on Parameter Values and Rules) |
|---|---|---|
| 'SourceName', | UIF | c1_1, |
| 'ISOCountryName', | Republic of India | c10_b, |
| 'PromotedBugFixAvailableIn', | 0 | c100_1, |
| 'Category', | Install and Update | c101_1, |
| 'PromotedBugFixedInBranch', | 0 | c102_1, |
| 'PromotedBugFixedInBuild', | 0 | c103_1, |
| 'PromotedBugId', | 0 | c104_1, |
| 'PromotedBugLink', | 0 | c105_1, |
| 'PromotedBugRank', | 0 | c106_1, |
| 'PromotedBugResolvedReason', | 0 | c107_b, |
| 'PromotedBugState', | 0 | c108_b, |
| 'PromotedBugTitle', | 0 | c109_b, |
| 'ISOCountryShortCode', | IN | c11_b, |
| 'PromotedBugType', | 0 | c110_other, |
| 'PromotedBugVsoName', | 0 | c111_1, |
| 'AADPuid', | 0 | c112_2, |
| 'CommercialId', | 0 | c113_1, |
| 'PromotionAreaPath', | OS\Core\ENS\Commercial\BizInnovation | c114_2, |
| 'PromotionAreaPathDefault', | OS\Core\ENS\Commercial\BizInnovation | c115_1, |
| 'PromotionRequestedByUser', | 0 | c116_1, |
| 'PromotionType', | 0 | c117_other, |
| 'Provider', | Microsoft.Windows.Fundamentals.Partner.UserInitiatedFeedback.FeedbackSubmitted | c118_1, |
| 'PublishedState', | New | c119_1, |
| 'ISOCountryShortName', | India | c12_other, |
| 'QuestId', | 0 | c120_other, |
| 'RegistrationStatus', | 0 | c121_other, |
| 'ReproScenarioCount', | 0 | c122_1, |
| 'RetailDeviceName', | 0 | c123_2, |
| 'ConformedFeedbackId', | uif\a23c5bd8-8836-4449-b6dc-e7f37fef7858 | c124_1, |
| 'Ring', | retail | c125_1, |
| 'SCCMClientId', | 0 | c126_-_2_60286796783935e+18, |
| 'ScreenshotCount', | 0 | c127_b, |
| 'SearchCategory', | 0 | c128_9, |
| 'SearchContextId', | 506 | c129_other, |
| 'SearchQuery', | 0 | c130_1, |
| 'SetupInstallType', | Update (DCAT UVS) | c131_1, |
| 'SetupUpgradeFromBranchName', | RS4_RELEASE | c132_3, |
| 'SetupUpgradeFromBuildNumber', | 17134 | c133_b, |
| 'ShellId', | 0 | c134_b, |
| 'Context', | Windows Activation | c135_b, |
| 'SimilarContextId', | 0 | c136_b, |
| 'SimilarFeedbackId', | 0 | c137_b, |
| 'SortCategory', | 0 | c138_-1_0, |
| 'SourceLocation', | Asimov Cll | c139_b, |
| 'IsOfflineComment', | 0 | c14_b, |

TABLE 1-continued

Artificial Words Generated based on Rules

| Schema Name | Parameter Value | Artificial Words (Based on Parameter Values and Rules) |
|---|---|---|
| 'SourceType', | Post | c140_b, |
| 'SourceURL', | Asimov cll | c141_b, |
| 'Tags', | Top Trending Feedback; UIF on-Submit Cab | c142_b, |
| 'TeamRank', | 0 | c143_26, |
| 'TenantId', | 0 | c144_b, |
| 'TotalPhysicalRAM', | 4096 | c145_b, |
| 'ContextID', | 506 | c146_b, |
| 'TPId', | 0 | c147_2, |
| 'TPIdHash', | 0 | c148_2, |
| 'TriagedBy', | mengsun@microsoft.com | c149_b, |
| 'IsOfflineSubmission', | FALSE | c15_b, |
| 'TriageSource', | TriageView.Group | c150_b, |
| 'UifVsoId', | 9064059 | c152_b, |
| 'UILanguage', | English (United States) | c153_b, |
| 'UniqueInstanceDeviceId', | g:6755413548899278 | c154_b, |
| 'UserId', | p:985157599285069 | c155_35_0, |
| 'UserSubmissionTags', | 0 | c156_1, |
| 'contextualtransform', | 0 | c157_1, |
| 'UserType', | 3 | c158_3, |
| 'VelocityFeatureConfigs', | 0 | c159_b, |
| 'IsPrimary', | FALSE | c16_b, |
| 'PostTextInEnglish', | 0 | c160_2, |
| 'PrimaryFeedbackTextInEnglish', | 0 | c161_b, |
| 'PrimaryFeedbackTitleInEnglish', | Activate window | c162_18363_0, |
| 'WatsonRelation'] | 0 | c163_476_0, |
| 'isgibberish', | 0 | c164_1, |
| 'ContextVersion', | 0 | c165_1, |
| 'CrashOrHangInfo', | 0 | c166_b, |
| 'CreationTimeStamp', | 43789.58479 | c167_20, |
| 'IsProblem', | TRUE | c17_b, |
| 'CustomFieldsResponses', | 0 | c171_b, |
| 'DefaultScenarioCount', | 1 | c172_b, |
| 'DeferUntilNumInstance', | 0 | c173_b, |
| 'DeviceApplicabilityFlags', | 33 | c174_b, |
| 'DeviceFamily', | Windows.Desktop | c175_b, |
| 'DeviceFormFactor', | 1 | c176_1, |
| 'DeviceGlobalId', | g:6966502015220840 | c177_1, |
| 'DeviceId', | g:6966502015220840 | c178_2_0, |
| 'DeviceLocalId', | s:F3AFD186-F035-4AE4-BA30-DCC83D94178E | c179_b, |
| 'IsRegisteredPilot', | FALSE | c18_b, |
| 'DeviceModel', | Acer-Aspire 315-51_z | c180_b, |
| 'Age', | Unknown | c181_b, |
| 'DeviceModelId', | −7.78099E+18 | c182_3, |
| 'DeviceModelKey', | 3.27699E+18 | c183_953869_0, |
| 'DeviceName', | # | c184_other, |
| 'DiagnosticsScenarioCount', | 1 | c185_b, |
| 'DimDeviceModelName', | Aspire 315-51_z | c186_b, |
| 'DimIsFirstParty', | FALSE | c187_other, |
| 'IsRetailPhone', | FALSE | c19_5, |
| 'Attitude', | 0 | c2_b, |
| 'IsSegmentCommercial', | FALSE | c20_b, |
| 'Flags', | 2 | c206_b, |
| 'FlightingBranch', | 19h1_release | c207_other, |
| 'FlightRing', | Retail | c208_other, |
| 'Gender', | Male | c209_b, |
| 'HasCensus', | TRUE | c210_1, |
| 'HashedDomainName', | 0 | c211_b, |
| 'HasMicrosoftResponse', | FALSE | c212_1_0, |
| 'HasValidPollValue', | FALSE | c213_other, |
| 'AppVer', | 1.1903.2331.0_x64_!2019/08/21:21:46:11!0!pilotshub app.exe | c214_b, |
| 'HasValidPostText', | FALSE | c215_b, |
| 'HasVerbatimComments', | FALSE | c216_3, |
| 'IMEI0', | 0 | c217_b, |
| 'IMEI1', | 0 | c218_17763_0, |
| 'Index', | 0 | c219_b, |
| 'IndustrySegment', | Consumer | c220_117_0, |
| 'InPilotRegistration', | FALSE | c221_b, |
| 'InterestedInDev', | 0 | c222_other, |
| 'InterestedInGameDev', | 0 | c223_1, |
| 'InterestedInHoloLensDev', | 0 | c224_1, |

TABLE 1-continued

Artificial Words Generated based on Rules

| Schema Name | Parameter Value | Artificial Words (Based on Parameter Values and Rules) |
| --- | --- | --- |
| 'AppVersion', | 0 | c225_1, |
| 'InterestedInIoTCoreDev', | 0 | c226_b, |
| 'InterestedInWinForBiz', | 0 | c227_b, |
| 'InternalComment', | 0 | c228_b, |
| 'InternalPrimaryDiagonalDisplaySizeInInches', | 15.5 | c229_6144_0, |
| 'InternalPrimaryDisplayResolutionHorizontal', | 1366 | c230_996233_4000000029, |
| 'InternalPrimaryDisplayResolutionVertical', | 768 | c231_b, |
| 'IsBug', | FALSE | c235_9200136_0, |
| 'AreaTargetingMethod', | 0 | c236_b, |
| 'IsCloudDomainJoined', | FALSE | c237_b, |
| 'IsComments', | TRUE | c238_b, |
| 'IsCommercial', | FALSE | c239_other, |
| 'IsDomainJoined', | FALSE | c240_2, |

Artificial-text generator 308 may be configured to generate artificial-text corpus 324 by constructing sentences from parameter values of a table or schema comprising parameter values 114, by applying artificial-text generation rules 116. For example, as a result of applying artificial-text generation rules 116 to parameter values 114 each parameter value in a record or row may be converted to a word. All of the words in the record or row may be concatenated to form a sentence of the artificial-text corpus 324. In the case of multiple records or rows, this sentence forming process may be repeated for each record or row of words that are generated based on the parameter values of each record or row and rules 116. In this manner, the context of parameter values 114 (e.g., nearby parameter values and positions of parameter values in the table or schema) is retained. In one example, if there are, 20 columns in a table and 500 rows, there would be 500 sentences. Each sentence would have a length of 20 words (e.g., each word in the sentence comes from one of the 20 columns of a row), and each word in each sentence would have a corresponding word from the same column in the other sentences, which would be positioned in the same order within a sentence. In other words, the position of a word (or parameter 114) in a sentence may provide meaningful information to machine learning model 110 with respect to context.

Feature vector generator 306 may be configured to receive free-text corpus 320 from free-text cleaning engine 304 and generate numerical feature vectors 322 based on the free-text corpus 320 for use in machine learning model 110.

Feature vector generator 310 may be configured to receive artificial-text corpus 324 from artificial-text generator 308 and generate numerical feature vectors 326 based on the artificial-text corpus 324 for use in machine learning model 110.

As described above with respect to FIG. 1, a numerical feature vector (e.g., numerical feature vectors 322 and/or numerical feature vectors 324) may comprise word embeddings or sentence embeddings and may be referred to as word embeddings or sentence embeddings. For example, feature vector generator 306 may be configured to utilize word embedding and/or sentence embedding models (e.g., Word2Vec and/or Doc2Vec) to generate numerical feature vector 322. Moreover, feature vector generator 310 may be configured to utilize word embedding and/or sentence embedding models (e.g., Word2Vec and/or Doc2Vec) to generate numerical feature vector 326. In general, word embedding models are used to map words or phrases from a vocabulary or text corpus to a corresponding vector of real numbers. Word2Vec may include a two-layer neural network that processes text by vectorizing words to generate the word embeddings. A Doc2Vec model is similar to Word2Vec but adds document identifiers to generate sentence embeddings. However, the present disclosure is not limited to using sentence embeddings, and feature vector generator 306 and/or feature vector generator 310 may generate other suitable types of numerical features vectors to represent free-text corpus 320 and/or the artificial-text corpus 324 respectively. In some embodiments, a Doc2Vec model may be used with Gensim to generate sentence embeddings 322 and/or sentence embeddings 326. Genism comprises an open-source library for unsupervised topic modeling and natural language processing using statistical machine learning.

In some embodiments, combining engine 312 is configured to receive and combine numerical feature vectors 322 and numerical feature vectors 326 to generate combined feature vectors 328. Combining engine 312 is further configured to transmit combined feature vector 328 to machine learning model 110.

As described above, machine learning model 110 may comprise a supervised learning model (e.g., a logistic regression model, a LightGBM model, a Random Forest model, etc.). Machine learning model 110 is configured to receive numerical feature vectors (e.g., sentence embeddings or word embeddings) based on free-text corpus 320 and artificial-text corpus 324. For example, machine learning model 110 is configured to receive combined sentence embedding 328 comprising sentence embedding 322 based on free-text 106 in addition to the sentence embedding 326 based on parameter values 114 and determine a classification with respect to free-text 112. Machine learning model 110 may be trained based on historical free-text data, corresponding historical parameter values, and corresponding historical classification results. In one example, the historical free-text data may have been classified (e.g., as actionable vs non-actionable, dismissed vs triaged, etc.) as a result of manual triage procedures performed by a user to generate the corresponding historical classification results.

During training of machine learning model 110, the machine learning algorithms may be optimized or adapted to output a classification result that is biased towards a specified prediction performance metric. For example, the focus of the trained machine learning model may be directed towards greater precision, greater recall, or a greater F1 score. This may allow users to skew classification results 130 according to their working constraints.

For example, in an embodiment including a system for classifying customer feedback regarding a computer implemented product, where users process and respond to customer feedback, the users may want machine learning model 110 to err on the side of classifying a greater percentage of customer feedback as actionable. This type of bias may be advantageous to the users because they have ample time and resources to investigate issues raised in the customer feedback and would like to handle a greater number of feedback records. In this embodiment, machine learning model 110 may be trained toward operating with a higher level of recall prediction performance.

On the other hand, some users may have fewer resources to investigate customer issues. In this case, the users may choose to adapt machine learning model 110 to err on the side of classifying a smaller percentage of customer feedback as actionable. In this embodiment, the model may be trained with a goal of generating classification results with a greater precision score. For a more balanced prediction performance result, machine learning model 110 may be trained to prioritize a higher F1 score.

Machine learning model 110 may be adapted for a desired type of prediction performance (e.g. recall, precision, F1 score, etc.) based on iterations on feature vectors utilized in during training of the model. In some embodiments, machine learning model 110 may be trained multiple times to produce multiple trained machine learning models 110, where each is optimized toward a different prediction performance (e.g., precision, recall, F1 score, etc.). A user may then select which version of trained machine learning model 110 to use in an inference pipeline for performing classification of free-text 112 and parameter values 114 according to their needs.

Machine learning model 110 may be evaluated for prediction performance by comparing model 110 outputs to prediction targets (e.g., the known historical classification results). The prediction performance metrics may be based on true positives (TP), true negatives (TN), false positives (FP), and false negatives (FN). For example, prediction precision may be determined based on the proportion of positive predictions that were correct (e.g., precision=TP/(TP+FP)). A macro precision prediction performance may be determined by computing the precision independently for each class (e.g., actionable and non-actionable) and then taking the average. Recall prediction performance metrics may also be determined (e.g., recall=TP/(TP+FN)). F1 scores consider the precision and the proportion of actual positives that were identified correctly (e.g., F1 score=2*(precision*recall)/(precision+recall)). Macro recall and F1 scores may also be determined.

In some embodiments, transfer learning may be applied in the training of machine learning model 110. In this regard, testing data from a first category of free-text 112 and parameter values 114 may be utilized to train machine learning model 110 for a second category of free-text 112 and parameters values 114. For example, with reference to the embodiment where systems 100 and 300 are part of a customer feedback system for computer implemented products or services, training data (e.g., historical combined free-text and artificial-text sentence embeddings 328, and corresponding historical classification results 130) from a first product, service, or feature may be used to train machine learning model 110 for classifying user feedback directed to a second product, service, or feature. In this embodiment, one or more parameter values 114 of the first and second products, services, or procedures should adhere to the same or a similar schema.

Figure 4:
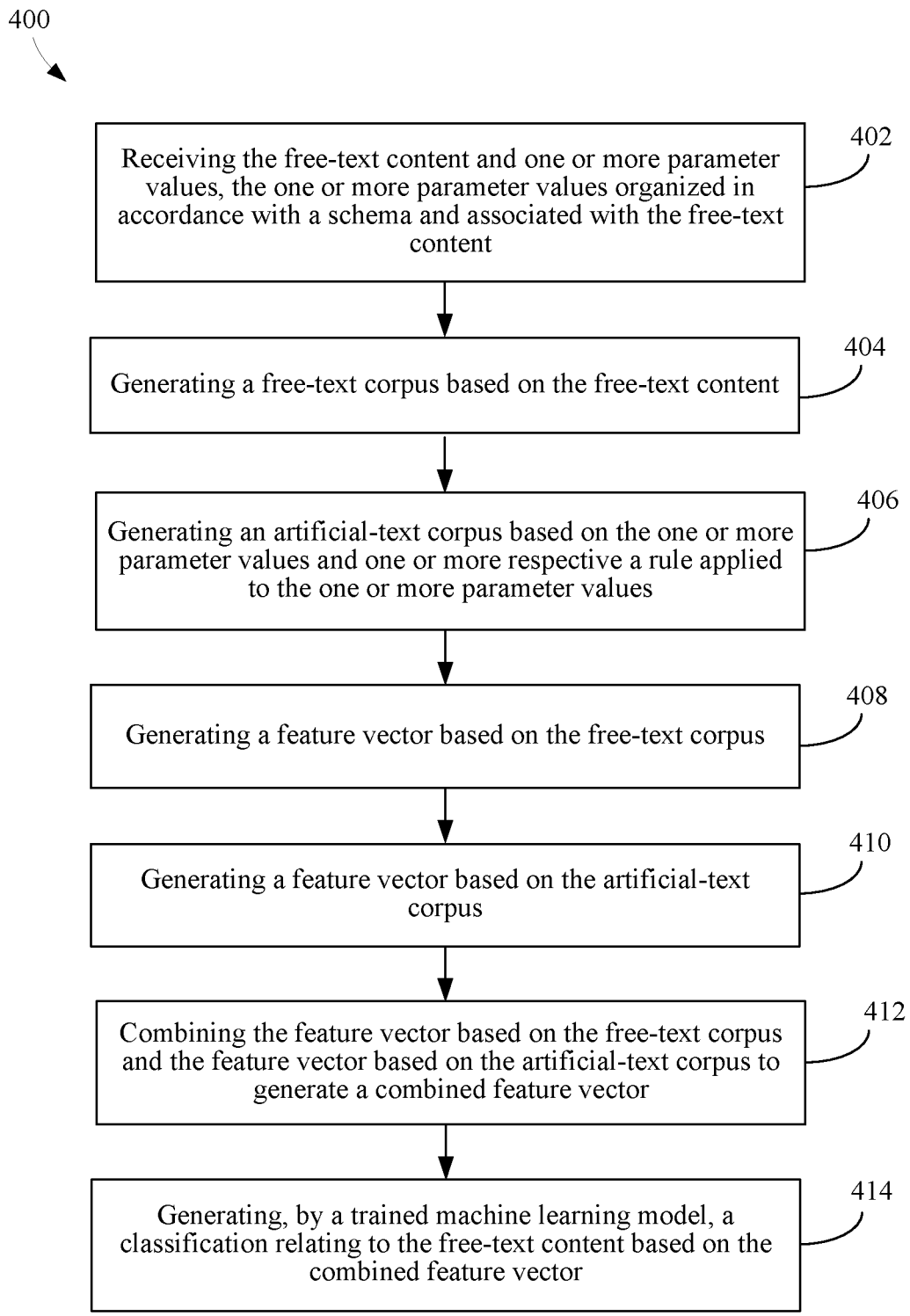
FIG. 4 is a flowchart of a method for converting structured data to artificial-text and classifying free-text using machine learning based on the free-text and the artificial-text, according to an example embodiment.

In embodiments, system 300 may operate in various ways to perform its functions. For example, FIG. 4 is a flowchart 400 of a method for converting structured data to artificial-text and classifying free-text using machine learning based on the free-text and the artificial-text, according to an example embodiment. Flowchart 400 may be performed by computing device 102. For the purpose of illustration, flowchart 400 of FIG. 4 is described with reference to FIG. 3.

Flowchart 400 of FIG. 4 begins with step 402. In step 402, free-text content and one or more parameter values are received, wherein the one or more parameter values are organized in accordance with a schema and associated with the free-text content (e.g., from the same or corresponding records of data files 104). For example, free-text 112 and one or more parameter values 114 may be extracted from one or more data files 104. Free-text 112 may be received by free-text cleaning engine 304. One or more parameter values 114 may be received by artificial-text generator 308. In some embodiments, data files 104 may receive data from one or more streams of data and may be formatted as comma separated values. As described above, free-text 112 may comprise verbal communication having a grammatical basis, such as written or spoken natural language. Parameter values 114 may be stored in a table and/or may be organized according to a schema. Each of the one or more parameter values 114 may be associated with a parameter (e.g., a parameter name, a schema name, a column heading, a tag, a label, an index, etc.). Parameter values 114 may provide supplemental information relative to classifying free-text 112.

In step 404, a free-text corpus is generated based on the free-text content. For example, free-text cleaning engine 304 may generate free-text corpus 320. Free-text cleaning engine 304 may perform text cleaning techniques (e.g., removing HTML, tokenization, removing punctuation, removing stop words, lemmatization or stemming, etc.) on free-text 112, and generate free-text corpus 320 based on cleaned free-text 112. In some embodiments, when performing tokenization or sentence boundary detection, free-text cleaning engine 304 may retain special characters that pertain to the subject matter of free-text 112 (e.g., character "#"). Free-text cleaning engine 304 may transmit free-text corpus 320 to feature vector generator 306.

In step 406, an artificial-text corpus is generated based on the one or more parameter values and one or more respective rules applied to the one or more parameter values. For example, artificial-text corpus 324 may be generated based on the one or more parameters values 114 and one or more respective rules 116 applied to the one or more parameters values 114. Rules 116 may specify how to generate artificial-text corpus 324 from parameter values 114 and/or schema information. In some embodiments, parameter values 114 may be organized according to a schema representing a table with columns having column headers and rows of fields comprising parameter values 114 distributed over the columns. As described above with respect to FIG. 3, artificial-text generator 308 may be configured to generate artificial-text corpus 324 based on the one or more parameter values 114 and rules 116. Rules 116 may specify how to generate artificial-text corpus 324 from the one or more parameter values 114 and the schema information. Artificial-text generator 308 is configured to convert the one or more parameter values 114 to a finite set of words based rules 116 and concatenate the words of the finite set of words into a fixed sequence wordlist to generate artificial-text corpus 324.

In step 408, a feature vector is generated based on the free-text corpus. For example, feature vector generator 306 may receive free-text corpus 320 from free-text cleaning engine 304 and generate numerical feature vector 322 based on free-text corpus 320 for use in machine learning model 110. As described above, numerical feature vector 322 may comprise word embeddings or sentence embeddings and may be referred to as word embeddings 322 or sentence embeddings 322. Feature vector generator 306 may utilize word embedding and/or sentence embedding models (e.g., Word2Vec and/or Doc2Vec) to generate numerical feature vectors 322. A word embedding model may map words or phrases of free-text corpus 320 to a corresponding vector of real numbers. Word2Vec may include a two-layer neural network that processes free-text corpus 320 by vectorizing words to generate the word embeddings. A Doc2Vec model may add document identifiers to generate sentence embeddings 322. However, the present disclosure is not limited to using sentence embeddings, and feature vector generator 306 may generate other suitable types of numerical features vectors 322 to represent free-text corpus 320. In some embodiments, a Doc2Vec model may be used with Gensim to generate sentence embeddings 322.

In step 410, a feature vector is generated based on the artificial-text corpus. For example, feature vector generator 310 may receive artificial-text corpus 324 from artificial-text generator 308 and generate numerical feature vector 326 based on artificial-text corpus 324 for use in machine learning model 110. As described above, numerical feature vector 324 may comprise word embeddings or sentence embeddings and may be referred to as word embeddings 326 or sentence embeddings 326. For example, feature vector generator 310 may utilize word embedding and/or sentence embedding models (e.g., Word2Vec and/or Doc2Vec) to generate numerical feature vectors 326. In some embodiments, a Doc2Vec model may be used with Gensim to generate sentence embeddings 326. Word embedding models may map words or phrases from artificial-text corpus 324 to a corresponding vector of real numbers 326. Word2Vec may include a two-layer neural network that processes artificial-text corpus by vectorizing words to generate the word embeddings. Doc2Vec model may add document identifiers to generate sentence embeddings 326. However, the present disclosure is not limited to using sentence embeddings, and feature vector generator 310 may generate other suitable types of numerical features vectors to represent artificial-text corpus 324.

In step 412, the feature vector based on the free-text corpus and the feature vector based on the artificial-text corpus are combined to generate a combined feature vector. For example, combining engine 312 may receive and combine numerical feature vectors 322 and numerical feature vectors 326 (e.g., sentence embeddings 322 and 326) to generate combined feature vectors 328 (e.g., combined sentence embedding 328). Combining engine 312 may transmit combined feature vector 328 to machine learning model 110.

In step 414, a trained machine learning model generates a classification relating to the free-text content based on the combined feature vector. For example, trained machine learning model 110 may generate one or more of classification results 130, 332, or 334 relating to free-text 112 content, based on combined feature vector 328. Trained machine learning model 110 may comprise a supervised learning model (e.g., a logistic regression model, a Light-GBM model, a Random Forest model, etc.). Trained machine learning model 110 may receive numerical feature vectors based on free-text corpus 320 and artificial-text corpus 324. For example, machine learning model 110 may receive combined sentence embedding 328 (e.g., comprising sentence embedding 322 and sentence embedding 326) and determine one or more of classification results 130, 332, or 334. Machine learning model 110 may be trained based on historical free-text data, corresponding historical parameter values, and corresponding historical classification results (e.g., as actionable vs non-actionable, dismissed vs triaged, etc.).

Machine learning model 110 may be optimized or adapted to output a classification that is biased towards a specified prediction performance metric, for example, towards greater precision, greater recall, or a greater F1 score. This may allow users to skew classification results 130 according to their working constraints. Machine learning model 110 may be adapted for a desired type of prediction performance (e.g. recall, precision, F1 score, etc.) based on iteration on feature vectors utilized in during training of the model. In some embodiments, machine learning model 110 may be trained multiple times to produce multiple trained versions of machine learning models 110, where each is optimized toward a different prediction performance (e.g., precision, recall, F1 score, etc.). For example, classification result 130 may be output from machine learning model 110 as optimized for generating classifications with a greater level of precision. Classification result 332 may be output from machine learning model 110 as optimized for generating classification results with a greater level of recall. Moreover, classification result 334 may be output from machine learning model 110 as optimized for generating classification results with greater F1 scores. A user may then select which version of machine learning model 110 to use in an inference pipeline for performing classification of free-text 112 and parameter values 114 according to their needs. Machine learning model 110 may be evaluated by comparing classification outputs to prediction targets (e.g., the known historical classification results) to determine prediction performance.

In some embodiments, transfer learning may be applied in the training of machine learning model 110. In this regard, testing data from a first category of free-text 112 and parameter values 114 may be utilized to train machine learning model 110 for a second category of free-text 112 and parameters values 114. In this embodiment, one or more parameter values 114 of the first and second products, services, or procedures should adhere to the same or a similar schema.

Figure 5A:
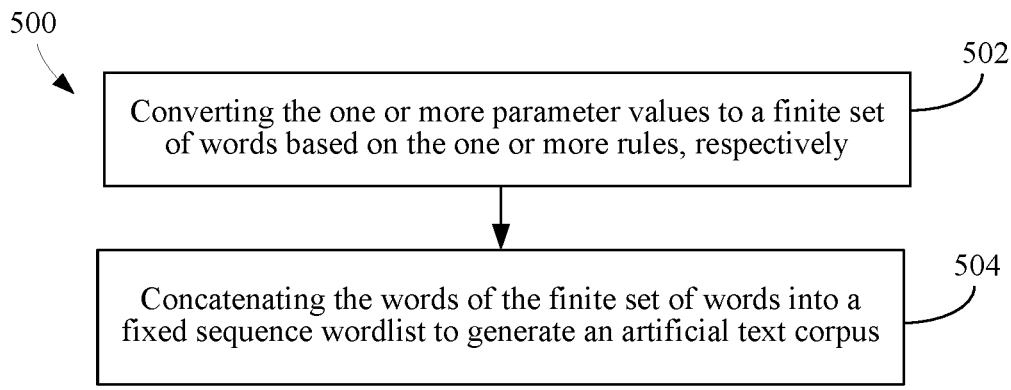
FIG. 5A is a flowchart of a method for generating an artificial-text corpus based on one or more parameter values and one or more rules, according to an example embodiment.

In embodiments, system 300 may operate in various ways to perform its functions. For example, FIG. 5A is a flowchart 500 of a method for generating an artificial-text corpus based on one or more parameter values and one or more rules, according to an example embodiment. Flowchart 500 may be performed by computing device 102. For the purpose of illustration, flowchart 500 of FIG. 5A is described with reference to FIG. 3.

Flowchart 500 of FIG. 5 begins with step 502. In step 502, the one or more parameter values are converted to a finite set of words based on one or more rules, respectively. For example, artificial-text generator 308 may generate artificial-text corpus 324 based on one or more parameter values 114 and one or more rules 116 applied to the one or more parameter values 114 respectively. Some examples of rules 116 include 1) converting parameter values of a particular parameter name (i.e., schema name or column name) to a word comprising either blank or a non-blank, 2) using parameter values having a particular parameter name as words, 3) converting numerals having a particular parameter name to a word, 3) concatenating a parameter value with a corresponding parameter name to form a word. Rules 116 may be determined based on analysis of a plurality of sets (or records) of one or more parameter values 114. For example, the plurality of sets of parameter values 114 used for determining artificial-text generation rules 116 may comprise historical or training data. Alternatively, or in addition, artificial-text generation rules 116 may be determined based on multiple sets of parameter values 114 from records of data files 104 that have not yet been classified. Further methods for generating the rules 116 are described with respect to FIG. 3.

In step 504, the words of the finite set of words are concatenated into a fixed sequence wordlist to generate an artificial-text corpus. For example, artificial-text generator 308 may concatenate the words of the finite set of words into a fixed sequence wordlist to generate artificial-text corpus 320.

Figure 5B:
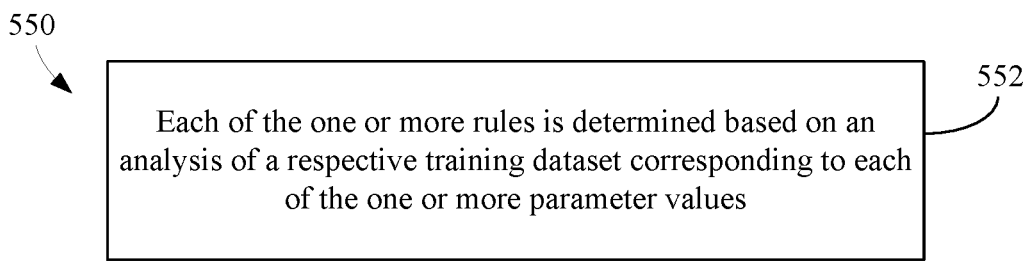
FIG. 5B is a flowchart of a method for determining artificial-text generation rules, according to an example embodiment.

In embodiments, system 300 may operate in various ways to perform its functions. For example, FIG. 5B is a flowchart 550 of a method for determining artificial-text generation rules, according to an example embodiment. Flowchart 550 may be performed by computing device 102. For the purpose of illustration, flowchart 550 of FIG. 5B is described with reference to FIG. 3.

Flowchart 550 of FIG. 5B comprises step 552. In step 552, each of the one or more rules is determined based on an analysis of a respective training dataset corresponding to each of the one or more parameter values. For example, a dataset that may be processed for training machine learning module 110 may comprise parameter values 114 organized according to a schema or as a table of columns with multiple rows of records of parameter values 114. For each column (or schema name) of the dataset, artificial-text generator 304 may analyze parameter values 114 of the column (or of the schema name) to determine a rule for generating words for the artificial-text corpus 324 based on an application of the rule to each parameter value 114 of the column. For each column of the dataset, artificial-text generator 304 may determine a rule 116 for converting the parameter values 114 of the column to words, where the words comprise less data than the original parameter values 114. Thus, the size of artificial-text corpus 324 comprising the generated words (or sentences comprising the generated words) and the dimensions of feature vector 322 are reduced.

Figure 6:
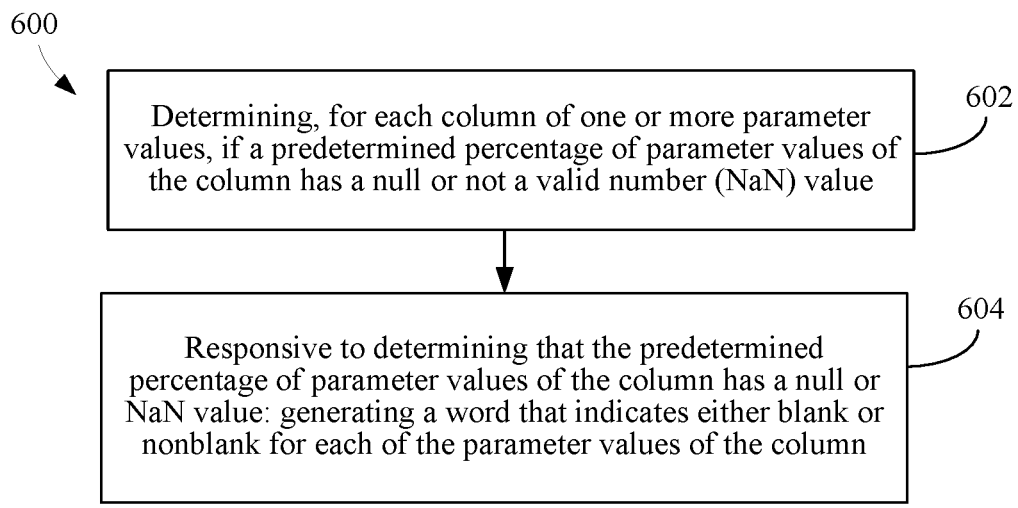
FIG. 6 is a flowchart of a method for determining an artificial-text generation rule, according to an example embodiment.

In embodiments, system 300 may operate in various ways to perform its functions. For example, FIG. 6 is a flowchart 600 of a method for determining an artificial-text generation rule, according to an example embodiment. Flowchart 600 may be performed by computing device 102. For the purpose of illustration, flowchart 600 of FIG. 6 is described with reference to FIG. 3.

Flowchart 600 of FIG. 6 begins with step 602. In step 602, it is determined, for each column of one or more parameter values, if a predetermined percentage of parameter values of the column has a null or not a valid number (NaN) value. For example, artificial-text generator 308 may determine whether a predetermined percentage of parameter values 114 of a particular column (or schema name) has a null or NaN value. In one example, N may equal 95 such that it is determined whether 95% of the parameter values in a column have a NULL value.

In step 604, responsive to determining that the predetermined percentage of parameter values of the column has a null or NaN value: generating a word that indicates either blank or nonblank for each of the parameter values of the column. For example, responsive to determining that the predetermined percentage of parameter values (e.g., 95%) of the particular column has a null or NaN value, artificial-text generator 308 utilizes a word that indicates either blank or nonblank for each of the parameter values of the particular column.

Figure 7:
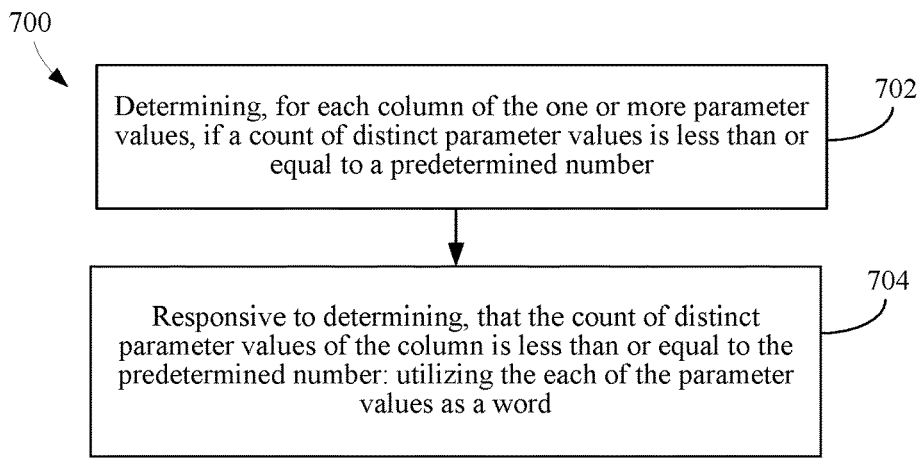
FIG. 7 is a flowchart of a method for determining an artificial-text generation rule, according to an example embodiment.

In embodiments, system 300 may operate in various ways to perform its functions. For example, FIG. 7 is a flowchart 700 of a method for determining an artificial-text generation rule, according to an example embodiment. Flowchart 700 may be performed by computing device 102. For the purpose of illustration, flowchart 700 of FIG. 7 is described with reference to FIG. 3.

Flowchart 700 of FIG. 7 begins with step 702. In step 702, it is determined, for each column of the one or more parameter values, if a count of distinct parameter values is less than or equal to a predetermined number. For example, artificial-text generator 308 determines whether a distinct count of values of a particular column (or schema name) is less than or equal to a predetermined number. In other words, artificial-text generator 308 counts the number of distinct parameter values 114 in a column and determines if there are less than or equal to M distinct parameter values. In one example, M may equal 20 and artificial-text generator 308 may determine whether the number of parameter values in each column is less than or equal to 20.

In step 704, responsive to determining, that the count of distinct parameter values of the column is less than or equal to the predetermined number: utilizing the each of the parameter values as a word. For example, for each column (or schema name) of the one or more parameter values 114, responsive to determining that the count of distinct values of the column is less than or equal to the predetermined number (e.g., M=20), artificial-text generator 308 utilizes the parameter values of the column (or schema name) as a word. In one example, where M equals 20, if the number of values in a particular column is less than or equal to 20, the parameter values of the column are used as a word.

Figure 8:
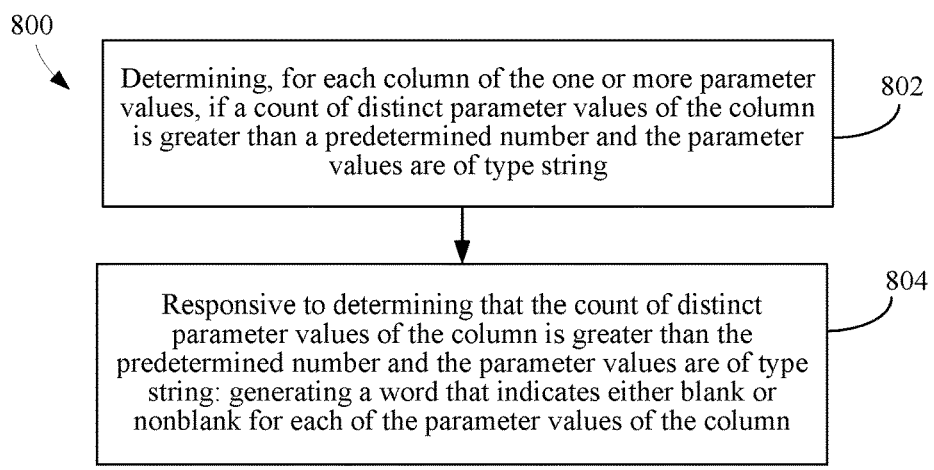
FIG. 8 is a flowchart of a method for determining an artificial-text generation rule, according to an example embodiment.

In embodiments, system 300 may operate in various ways to perform its functions. For example, FIG. 8 is a flowchart 800 of a method for determining an artificial-text generation rule, according to an example embodiment. Flowchart 800 may be performed by computing device 102. For the purpose of illustration, flowchart 800 of FIG. 8 is described with reference to FIG. 3.

Flowchart 800 of FIG. 8 begins with step 802. In step 802, determine, for each column of the one or more parameter values, if a count of distinct parameter values of the column is greater than a predetermined number and the parameter values are of type string. For example, for each of the columns (or schema names) of the one or more parameter values 114, artificial-text generator 308 may determine whether a count of distinct parameter values of the column is greater than a predetermined number (e.g., M=20) and whether the parameter values are of type string.

In step 804, responsive to determining that the count of distinct parameter values of the column is greater than the predetermined number and the parameter values are of type string: generating a word that indicates either blank or nonblank for each of the parameter values of the column.

For example, if the count of distinct parameter values within the column is greater than M, and the parameter values are of type=string, then artificial-text generator 308 replaces all the values within the field with a word that indicates blank or nonblank. In one example, M may equal 20. Then for each field, if the count of parameter values 114 within the field is greater than 20, and the field is of type=string, artificial-text generator 308 replaces all of the parameter values 114 within the field with "_blank" or "_nonblank."

Figure 9:
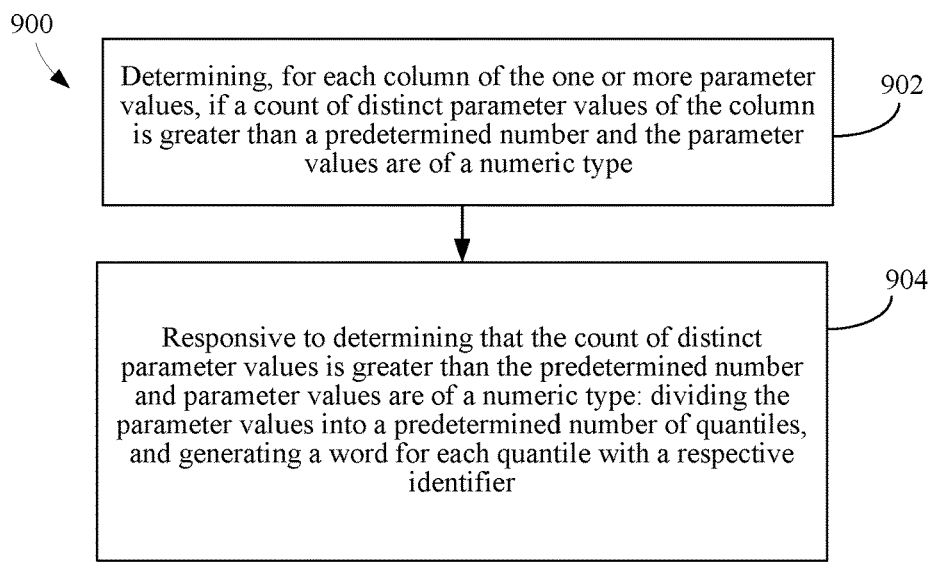
FIG. 9 is a flowchart of a method for determining an artificial-text generation rule, according to an example embodiment.

In embodiments, system 300 may operate in various ways to perform its functions. For example, FIG. 9 is a flowchart 900 of a method for determining an artificial-text generation rule, according to an example embodiment. Flowchart 900 may be performed by computing device 102. For the purpose of illustration, flowchart 900 of FIG. 9 is described with reference to FIG. 3.

Flowchart 900 of FIG. 9 begins with step 902. In step 902, it is determined, for each column of the one or more parameter values, if a count of distinct parameter values of the column is greater than a predetermined number and the parameter values are of a numeric type. For example, for each column (or schema name) of the one or more parameter values 114, artificial-text generator 308 may determine whether a count of distinct parameter values of the column is greater than a predetermined number (e.g., M), and the parameter numbers are of type numeric.

In step 904, responsive to determining that the count of distinct parameter values is greater than the predetermined number and parameter values are of a numeric type: dividing the parameter values into a predetermined number of quantiles, and generating a word for each quantile with a respective identifier. For example, responsive to determining that the count of distinct parameter values of the column is greater than the predetermined number (e.g., M), and the parameter values are of type=numeric, artificial-text generator 308 may divide the parameter values of the column into a predetermined number (e.g., X) of quantiles and generate a word for each quantile comprising the value of the quantile with a respective word identifier based on its quantile order, such as "_word0" to "_wordX−1." In one example, M may equal 20 and X may equal 12. Then, if the count of distinct parameter values of the column is greater than 20, and the parameters of the column are of type=numeric, then artificial-text generator 308 divides all of the parameter values of the column into 12 quantiles. Artificial-text generator 308 uses each quantile as a separate word, and assigns the 12 words as _word0 to _word11 respectively. For example, for a column named "SetupUpgradeFromBuildNumber" where the column comprises greater than 20 numeric type parameter values, and the first of 12 quantiles comprises the value 16299, the first quantile may be converted to a word as: "_SetupUpgradeFromBuildNumber_16299_0_."

Figure 10:
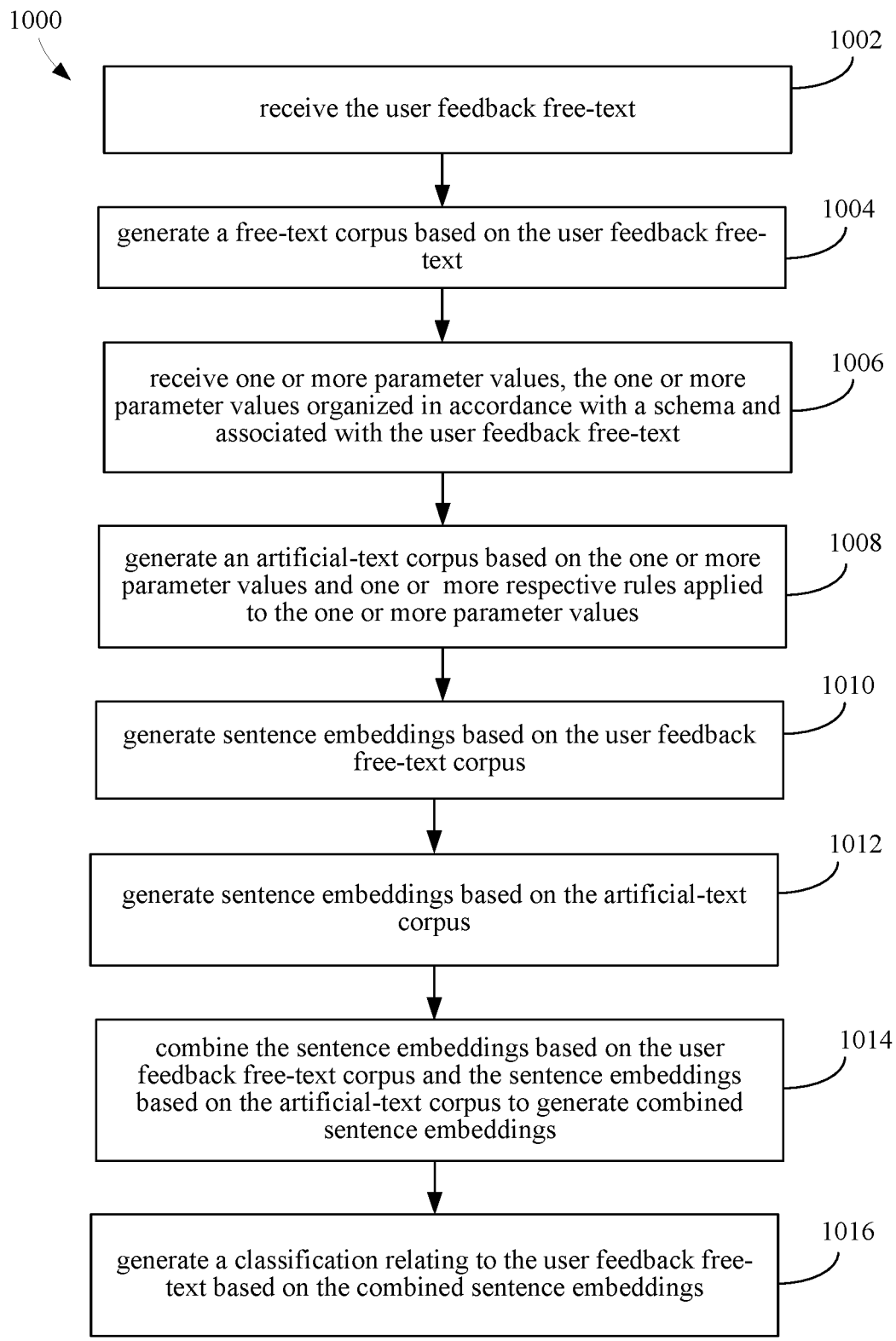
FIG. 10 is a flowchart of a method for classifying customer feedback using a trained machine learning model, according to an example embodiment.

In embodiments, system 300 may operate in various ways to perform its functions. For example, FIG. 10 is a flowchart 1000 of a method for classifying customer feedback using a trained machine learning model, according to an example embodiment. Flowchart 1000 may be performed by computing device 102. For the purpose of illustration, flowchart 1000 of FIG. 10 is described with reference to FIG. 3.

Flowchart 1000 of FIG. 10 begins with step 1002. In step 1002, user feedback free-text is received. For example, free-text cleaning engine 304 may receive user feedback in the form of free-text 112, which may be extracted from data files 104.

In step 1004, a free-text corpus is generated based on the user feedback free-text. For example, free-text cleaning engine 304 may be configured to perform text cleaning techniques on the user feedback free-text, and generate free-text corpus 320 based on cleaned user feedback. The text cleaning techniques may include, for example, removing HTML, tokenization, removing punctuation, removing stop words, lemmatization or stemming, etc.

In step 1006, one or more parameter values are received, the one or more parameter values are organized in accordance with a schema and associated with the user feedback free-text. For example, artificial-text generator 308 may receive one or more parameter values 114 that are related to the user feedback free-text 112. The one or more parameter values 114 may be organized in accordance with a schema and may include schema information. The one or more parameter values 114 may be extracted from data files 104.

In step 1008, an artificial-text corpus is generated based on the one or more parameter values and one or more respective rules applied to the one or more parameter values. For example, artificial-text generator 308 may generate artificial-text corpus 324 based on the one or more parameter values 114 related to the user feedback and rules 116. Artificial-text generator 308 may convert the one or more parameter values 114 to a finite set of words based on one or more rules 116 respectively and concatenate the words of the finite set of words into a fixed sequence wordlist to generate artificial-text corpus 324.

In step 1010, sentence embeddings are generated based on the user feedback free-text corpus. For example, feature vector generator 306 may utilize a sentence embedding model (e.g., Doc2Vec) to generate user feedback sentence embedding 322. In some embodiments, a Doc2Vec model may be used with Gensim to generate sentence embeddings 322. Genism comprises an open-source library for unsupervised topic modeling and natural language processing using statistical machine learning.

In step 1012, sentence embeddings are generated based on the artificial-text corpus. For example, feature vector generator 310 may utilize a sentence embedding model (e.g., Doc2Vec) to generate numerical feature vector 326. In some embodiments, the Doc2Vec model may be used with Gensim to generate sentence embeddings 322.

In step 1014, the sentence embeddings based on the user feedback text corpus and the sentence embeddings based on the artificial-text corpus are combined to generate combined sentence embeddings. For example, combining engine 312 is configured to receive and combine sentence embeddings 322 and sentence embeddings 326 to generate combined sentence embeddings 328. Combining engine 312 may transmit combined sentence embeddings 328 to machine learning model 110.

In step 1016, a classification relating to the user feedback free-text is generated based on the combined sentence embeddings. For example, as described above, machine learning model 110 may comprise a supervised learning model (e.g., a logistic regression model, a LightGBM model, a Random Forest model, etc.). Machine learning model 110 may receive sentence embeddings 322 based on user feedback free-text corpus 320 and sent artificial-text corpus 324. For example, machine learning model 110 may receive combined sentence embedding 328 and determine a classification with respect to the user feedback. Machine learning model 110 may be optimized or adapted to output a classification that is biased towards a specified prediction performance metric (e.g., precision, recall, F1 score, etc.). This may allow users to skew classification results 130 according to their working constraints. For example, in a system for classifying customer feedback regarding a computer implemented product where users process and respond to customer feedback, the users may want to err on the side of classifying a greater percentage of customer feedback as actionable because the users have ample time and resources to investigate issues. In this embodiment, machine learning model 110 may be trained toward operating with a higher level of recall prediction performance. On the other hand, some users may have fewer resources to investigate issues. In this case, the users may choose to adapt machine learning model 110 to err on the side of classifying a smaller percentage of customer feedback as actionable. In this embodiment, the model may be trained with a goal of generating classification results having a greater precision score. For a more balanced prediction performance result, machine learning model 110 may be trained to prioritize an F1 score. Machine learning model 110 may be adapted for a desired type of prediction performance (e.g. recall, precision, F1 score, etc.) based on iteration on feature vectors utilized in during training of the model. In some embodiments, machine learning model 110 may be trained multiple times to produce multiple trained machine learning models 110, where each is optimized toward a different prediction performance (e.g., precision, recall, F1 score, etc.). A user may then select which model to use in an inference pipeline for performing classification of free-text 112 and parameter values 114 according to their needs. Machine learning model 110 may be evaluated by comparing model 110 outputs to prediction targets (e.g., known historical classification results) to determine prediction performance.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, system 300 of FIG. 3, and system 900 of FIG. 9 along with any components and/or subcomponents thereof, as well any operations and portions of flowcharts/flow diagrams described herein and/ or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 11:
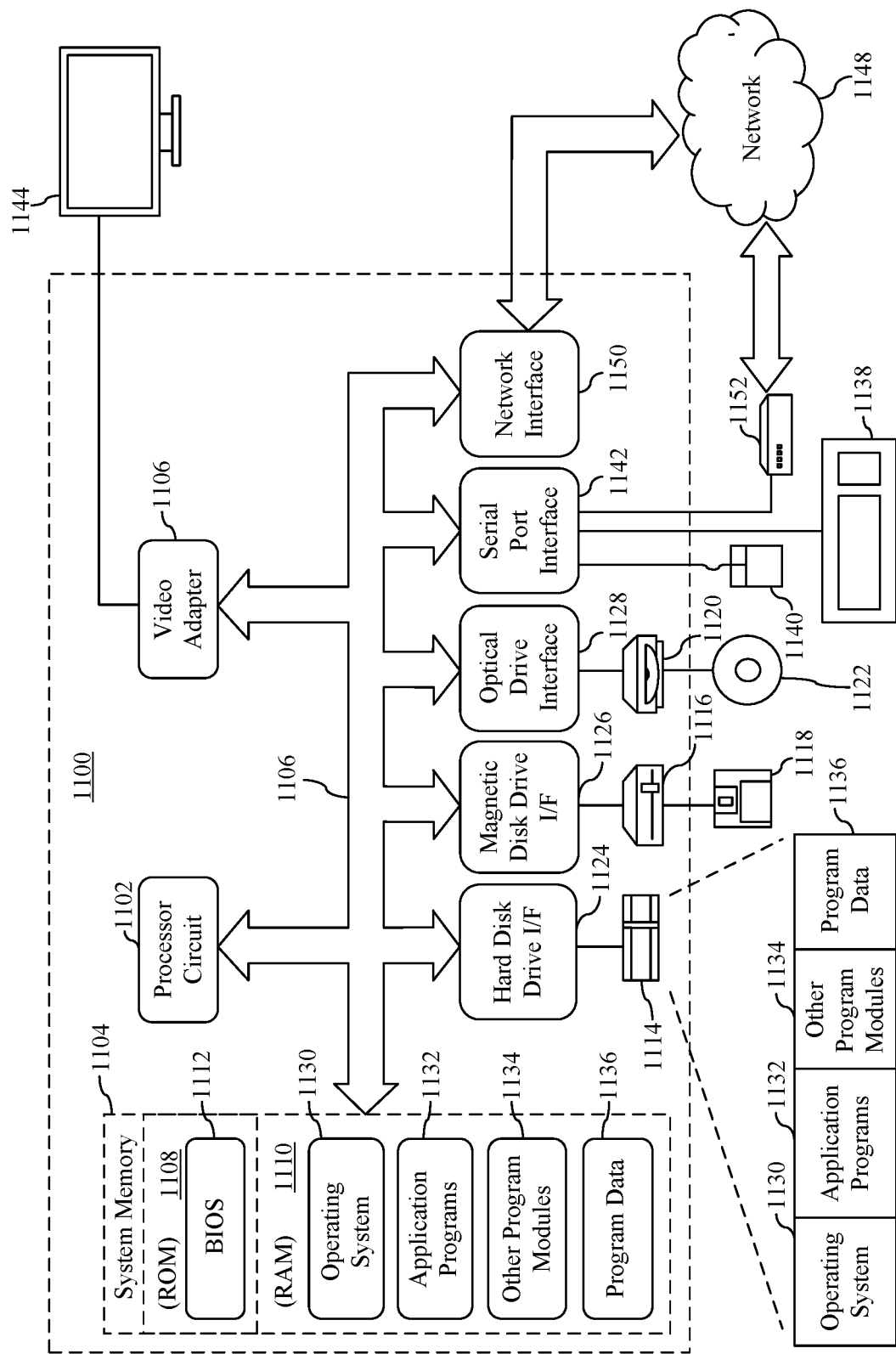
FIG. 11 is a block diagram of an example processor-based computer system that may be used to implement various embodiments.

FIG. 11 is a block diagram of an example processor-based computer system 1100 that may be used to implement various embodiments. Computing device 102 may include any type of computing device, mobile or stationary, such as a desktop computer, a server, a video game console, etc. For example, computing device 102 may be any suitable type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/ system (e.g., Microsoft Xbox®, Sony PlayStation®, Nintendo Wii® or Switch®, etc.), etc.

Computing device 102 may be implemented in one or more computing devices containing features similar to those of computing device 1100 in stationary or mobile computer embodiments and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing free-text processing pipeline 106, artificial-text processing pipeline 108, artificial-text generation rules 116, machine learning model 110, free-text cleaning engine 304, feature vector generator 306, artificial-text generator 308, feature vector generator 310, combining engine 312, flowchart 200, flowchart 400, flowchart 500, flowchart 550, flowchart 600, flowchart 700, flowchart 800, flowchart 900, flowchart 1000, and/or further embodiments described herein. Program data 1136 may include data files 104, free-text 112, parameter values 114, classification output 130, free-text corpus 320, numeric feature vector 322, numeric feature vector 326, combined feature vector 328, classification output 332, classification output 324, and/or further embodiments described herein.

A user may enter commands and information into computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

In an embodiment, a machine learning system is provided for classifying user feedback text. The system comprises one or more processors and one or more memory devices that store program code to be executed by the one or more processors. The program code comprises a text cleaning engine configured to receive the user feedback text and generate a text corpus based on the user feedback text. An artificial-text generator is configured to receive one or more parameter values. The one or more parameter values are organized in accordance with a schema and associated with the user feedback text. The artificial text generator is configured to generate an artificial-text corpus by applying each of one or more rules to a respective one of the one or more parameter values. A first sentence embedding generator is configured to generate sentence embeddings based on the user feedback text corpus. A second sentence embedding generator is configured to generate sentence embeddings based on the artificial-text corpus. A combining engine is configured to combine the sentence embeddings based on the user feedback text corpus and the sentence embeddings based on the artificial-text corpus to generate combined sentence embeddings. A trained machine learning model 110 is configured to generate a classification relating to the user feedback text based on the combined sentence embeddings.

In an embodiment of the foregoing system, the artificial-text generator is configured to generate the artificial-text corpus by converting the one or more parameter values to a finite set of words based on the one or more rules, respectively, and concatenating the words of the finite set of words into a fixed sequence wordlist to generate the artificial-text corpus.

In an embodiment of the foregoing system, each of the one or more rules is determined based on an analysis of a respective training data set corresponding to each of the one or more parameter values.

In an embodiment of the foregoing system, the trained machine learning model is trained based on a second combined sentence embeddings that is based on a second instance of user feedback text and a second instance of one or more parameter values organized in accordance with the same schema. The second instance of the one or more parameter values is associated with the second instance of user feedback text. The trained machine learning model is also trained based on a known classification relating to the second instance of user feedback text.

In an embodiment of the foregoing system, the trained machine learning model is trained based on transferred sentence embeddings of a different category user feedback text corpus and transferred sentence embeddings of a different category artificial-text corpus associated with the different category user feedback text corpus.

In an embodiment of the foregoing system the trained machine learning model is trained based on a selectable optimization metric comprising at least one of: F1-score, recall, and precision.

In an embodiment of the foregoing system, the sentence embeddings generated based on the user feedback text corpus and the artificial-text corpus are generated based on a Doc2Vec algorithm.

In an embodiment of the foregoing system, the trained machine learning model comprises a logistic regression model, a LightGBM model, or a Random Forest model.

In an embodiment, a machine learning method for classifying free-text content comprises receiving the free-text content and receiving one or more parameter values, where the one or more parameter values are organized in accordance with a schema and associated with the free-text content. The method further comprises generating a free-text corpus based on the free-text content and generating an artificial-text corpus by applying each of one or more rules to a respective one of the one of the one or more parameter values. A feature vector is generated based on the free-text corpus. A feature vector is generated based on the artificial-text corpus. The feature vector based on the free-text corpus and the feature vector based on the artificial-text corpus are combined to generate a combined feature vector. A trained machine learning model generates a classification relating to the free-text content based on the combined feature vector.

In an embodiment of the foregoing method, generating the artificial-text corpus comprises converting the one or more parameter values to a finite set of words based on the one or more rules, respectively, and concatenating the words of the finite set of words into a fixed sequence wordlist to generate the artificial-text corpus.

In an embodiment of the foregoing system each of the one or more rules is determined based on an analysis of a respective training data set corresponding to each of the one or more parameter values.

In an embodiment of the foregoing system each of the feature vector based on the free-text corpus and the feature vector based on the artificial-text corpus comprise sentence embeddings.

In an embodiment of the foregoing system the trained machine learning model is trained based on a transferred feature vector of a different category free-text corpus and a transferred feature vector of a different category artificial-text corpus associated with the different category free-text corpus.

In an embodiment of the foregoing system the trained machine learning model is trained based on a selectable optimization metric comprising at least one of an F1-score, recall, and precision.

In an embodiment of the foregoing system the free-text content comprises user feedback relating to a computer-implemented product or service, and the one or more parameter values comprise data related to the computer-implemented product or service, and/or a computing device upon which the computer-implemented product or service is implemented.

In an embodiment, a machine learning system for classifying free-text content comprises one or more processors and one or more memory devices that store program code to be executed by the one or more processors. The program code comprises a text cleaning engine configured to receive the free-text content and generate a free-text corpus based on the free-text content. An artificial-text generator is configured to receive one or more parameter values, where the one or more parameter values are organized in accordance with a schema and associated with the free-text content, and generate an artificial-text corpus by applying each of one or more rules to a respective one of the one or more parameter values. A first feature vector generator is configured to generate a feature vector based on the free-text corpus. A second feature vector generator is configured to generate a feature vector based on the artificial-text corpus. A combining engine configured to combine the feature vector based on the free-text corpus and the feature vector based on the artificial-text corpus to generate a combined feature vector. A trained machine learning model is configured to generate a classification relating to the free-text content based on the combined feature vector.

In an embodiment of the foregoing system the artificial-text generator is configured to generate the artificial-text corpus by converting the one or more parameter values to a finite set of words based on the one or more rules, respectively, and concatenate the words of the finite set of words into a fixed sequence wordlist to generate the artificial-text corpus.

In an embodiment of the foregoing system each of the one or more rules is determined based on an analysis of a respective training data set corresponding to each of the one or more parameter values.

In an embodiment of the foregoing system each of the feature vector based on the free-text corpus and the feature vector based on the artificial-text corpus comprise sentence embeddings.

In an embodiment of the foregoing system the trained machine learning model is trained based on a transferred feature vector of a different category free-text corpus and a transferred feature vector of a different category artificial-text corpus associated with the different category free-text corpus.

V. Conclusion

While various embodiments of the present methods and systems have been described above, they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments but should be defined only in accordance with the following claims and their equivalents.

What is claimed is:

1. A system comprising:
a processor; and
memory storing computer instructions that, when executed, perform operations to:
receive free-text content corresponding to user satisfaction feedback with performance of a software product or service, wherein the free-text content is naturally spoken or written feedback submitted by a user, and wherein submission of the free-text content causes creation of a data file comprising the free-text content;
    in response to submission of the free-text content, retrieve parameter values from the data file, wherein the parameter values are organized in accordance with a schema and comprise an identifier of at least one feature of the software product or service;
    generate a free-text corpus based on the user feedback text;
    generate an artificial-text corpus by applying a rule to at least one of the parameter values, the rule specifying instructions for converting the parameter values to a set of words, the artificial-text corpus comprising the set of words;
    generate first sentence embeddings based on the free-text corpus;
    generate second sentence embeddings based on the artificial-text corpus;
    generating first combined sentence embeddings by combining the first sentence embeddings and the second sentence embeddings;
    generate a classification relating to the free-text content based on the first combined sentence embeddings, the classification indicating whether the software product or service is functioning as expected; and
    based on determining the software product or service is not functioning as expected, at least one of providing technical support for the software product or service or updating the software product or service.

2. The system of claim 1, wherein to generate the artificial-text corpus comprises:
    concatenating the set of words into a fixed sequence wordlist.

3. The system of claim 1, wherein the rule is determined based on an analysis of a training data set corresponding to each of the parameter values.

4. The system of claim 1, wherein a trained machine learning model used to generate the classification is trained based on:
    second combined sentence embeddings based on a second instance of user feedback text and a second instance of parameter values organized in accordance with the schema, the second instance of parameter values being associated with the second instance of user feedback text; and
    a known classification relating to the second instance of user feedback text.

5. The system of claim 1, wherein a trained machine learning model used to generate the classification is trained based on transferred sentence embeddings of a category of the free-text corpus and transferred sentence embeddings of a category of the artificial-text corpus associated with the category of the free-text corpus.

6. The system of claim 1, wherein a trained machine learning model used to generate the classification is trained based on a selectable optimization metric comprising at least one of:
    F1-score;
    recall; or
    precision.

7. The system of claim 1, wherein the first sentence embeddings and the second sentence embeddings are generated based on a Doc2Vec algorithm.

8. The system of claim 1, wherein a trained machine learning model used to generate the classification comprises:
    a logistic regression model;
    a LightGBM model; or
    a Random Forest model.

9. A method comprising:
    receiving records extracted from a data file, the records comprising
        free-text content corresponding to user feedback for performance of a software product or service, wherein the free-text content is naturally spoken or written feedback submitted by a user, and wherein submission of the free-text content causes creation of a data file comprising the free-text content;
    in response to submission of the free-text content, retrieve parameter values from the data file, wherein the parameter values are organized in accordance with a schema and comprise an identifier of at least one feature of the software product or service;
    generating a free-text corpus based on the free-text content by at least one of:
        tokenizing the free-text content; or
        removing stop words from the free-text content;
    generating an artificial-text corpus by applying rules to the parameter values, the rules specifying instructions for converting the parameter values to a set of words and concatenating the set of words into a fixed sequence wordlist, the artificial-text corpus comprising the set of words;
    generating a first feature vector based on the free-text corpus;
    generating a second feature vector based on the artificial-text corpus;
    generating a combined feature vector by combining the first feature vector and the second feature vector;
    generating, by a trained machine learning model, a classification relating to the free-text content based on the combined feature vector, the classification indicating whether the software product or service is functioning as expected; and
    based on determining the software product or service is not functioning as expected, at least one of providing technical support for the software product or service or updating the software product or service.

10. The method of claim 9, wherein each of the rules is determined based on an analysis of a respective training data set corresponding to one or more of the parameter values.

11. The method of claim 9, wherein the first feature vector and the second feature vector each comprise sentence embeddings.

12. The method of claim 9, wherein the trained machine learning model is trained based on a transferred feature vector of a category of the free-text corpus and a transferred feature vector of a category of the artificial-text corpus.

13. The method of claim 9, wherein the trained machine learning model is trained based on a selectable optimization metric comprising at least one of:
    F1-score;
    recall; or
    precision.

14. The method of claim 9, wherein:
    the parameter values comprise data related to the product or service and to a computing device implementing the product or service.

15. A computing device comprising:
a processor; and
memory storing computer instructions that, when executed, perform operations to:
receive free-text content corresponding to user satisfaction feedback with performance of a software product or service, wherein the free-text content is naturally spoken or written feedback submitted by a user, submission of the free-text content causing creation of a data file comprising the free-text content;
in response to submission of the free-text content, retrieve parameter values from the data file, wherein the parameter values are organized in accordance with a schema and comprise an identifier of at least one feature of the software product or service;
generate a free-text corpus based on the free-text content text;
generate an artificial-text corpus based on the parameter values by applying a rule to at least one of the parameter values, the rule specifying instructions for converting the parameter values to a set of words, the artificial-text corpus comprising the set of words;
generate a first feature vector based on the free-text corpus;
generate a second feature vector based on the artificial-text corpus;
generating combined sentence embeddings by combining the first feature vector and the second feature vector;
generate, by a trained machine learning model, a classification relating to the free-text content based on the combined feature vector, the classification indicating whether the software product or service is functioning as expected; and
based on determining the software product or service is not functioning as expected, causing the software product or service to be updated.

16. The computing device of claim 15, wherein the artificial-text generator is configured to generate the artificial-text corpus comprises:
concatenating words of the set of words into a fixed sequence wordlist.

17. The computing device of claim 16, wherein the rule is determined based on an analysis of a respective training data set corresponding to at least one of the parameter values.

18. The computing device of claim 15, wherein the first feature vector and the second feature vector comprise sentence embeddings.

19. The computing device of claim 15, wherein the trained machine learning model is trained based on a transferred feature vector of a category of the free-text corpus and a transferred feature vector of a category of the artificial-text corpus.

20. The computing device of claim 15, wherein the classification indicates whether the free-text content is useful for providing customer service to the software product or service.

* * * * *